United States Patent
Gomes et al.

(10) Patent No.: US 9,140,479 B2
(45) Date of Patent: *Sep. 22, 2015

(54) SYNCHRONOUS TEMPERATURE RATE CONTROL AND APPARATUS FOR REFRIGERATION WITH REDUCED ENERGY CONSUMPTION

(75) Inventors: Alberto Regio Gomes, St. Joseph, MI (US); Stephen L. Keres, Watervliet, MI (US); Steven J. Kuehl, Stevensville, MI (US); Andrew D. Litch, St. Joseph, MI (US); Peter J. Richmond, Berrien Springs, MI (US); Guolian Wu, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 495 days.

This patent is subject to a terminal disclaimer.

(21) Appl. No.: 13/476,475

(22) Filed: May 21, 2012

(65) Prior Publication Data

US 2013/0305756 A1  Nov. 21, 2013

(51) Int. Cl.
| | |
|---|---|
| *G05D 23/32* | (2006.01) |
| *F25D 11/02* | (2006.01) |
| *F25D 29/00* | (2006.01) |
| *F25B 5/02* | (2006.01) |

(52) U.S. Cl.
CPC ............... *F25D 11/02* (2013.01); *F25D 29/00* (2013.01); *F25B 5/02* (2013.01); *F25B 2600/2511* (2013.01); *F25D 2700/12* (2013.01); *F25D 2700/122* (2013.01)

(58) Field of Classification Search
CPC ..... F25D 11/02; F25D 29/00; F25D 2700/12; F25D 2700/122; F25B 5/02; F25B 2600/2511
USPC ........... 62/126, 157, 178, 180, 182, 186, 231, 62/232
See application file for complete search history.

(56) References Cited

U.S. PATENT DOCUMENTS

| | | | | |
|---|---|---|---|---|
| 4,416,119 | A | * 11/1983 | Wilson et al. | ............. 62/149 |
| 4,481,787 | A | * 11/1984 | Lynch | ..................... 62/180 |
| 5,231,847 | A | 8/1993 | Cur et al. | |
| 5,375,428 | A | 12/1994 | LeClear et al. | |
| 5,524,447 | A | 6/1996 | Shim | |
| 5,901,562 | A | 5/1999 | Tunzi et al. | |

(Continued)

FOREIGN PATENT DOCUMENTS

| | | |
|---|---|---|
| EP | 1564513 | 8/2005 |
| JP | 06082141 A | 3/1994 |

(Continued)

*Primary Examiner* — Marc Norman
*Assistant Examiner* — Paolo Gonzalez

(57) ABSTRACT

A refrigerator appliance configuration, and associated methods of operation, for an appliance with a controller, a condenser, at least one evaporator, a compressor, and two refrigeration compartments. The configuration may be equipped with a variable-speed or variable-capacity compressor, variable speed evaporator or compartment fans, a damper, and/or a dual-temperature evaporator with a valve system to control flow of refrigerant through one or more pressure reduction devices. The controller, by operation of the compressor, fans, damper and/or valve system, depending on the appliance configuration, synchronizes alternating cycles of cooling each compartment to a temperature approximately equal to the compartment set point temperature.

5 Claims, 13 Drawing Sheets

(56) References Cited

U.S. PATENT DOCUMENTS

| | | |
|---|---|---|
| 5,983,654 A | 11/1999 | Yamamoto et al. |
| 5,992,165 A | 11/1999 | Kim et al. |
| 6,032,469 A | 3/2000 | Kim et al. |
| 6,101,826 A | 8/2000 | Bessler |
| 6,185,948 B1 * | 2/2001 | Niki et al. ............... 62/199 |
| 6,327,867 B1 | 12/2001 | Hyodo et al. |
| 6,397,608 B1 | 6/2002 | Sakuma et al. |
| 6,668,568 B2 | 12/2003 | Holmes et al. |
| 6,769,265 B1 | 8/2004 | Davis et al. |
| 6,802,186 B2 | 10/2004 | Homes et al. |
| 6,959,559 B2 | 11/2005 | Nam et al. |
| 7,100,387 B2 | 9/2006 | Boer et al. |
| 7,775,058 B2 | 8/2010 | Kaga et al. |
| 7,908,039 B2 * | 3/2011 | Kaga et al. ............... 700/299 |
| 2004/0187503 A1 * | 9/2004 | Davis et al. ............... 62/180 |
| 2009/0235677 A1 | 9/2009 | Yanagida et al. |
| 2010/0095691 A1 | 4/2010 | Kondou et al. |
| 2010/0115973 A1 * | 5/2010 | Kondou et al. ............... 62/115 |
| 2011/0162393 A1 | 7/2011 | Kuehl et al. |

FOREIGN PATENT DOCUMENTS

| | | |
|---|---|---|
| JP | 6137738 | 5/1994 |
| KR | 20020078094 | * 10/2002 |

* cited by examiner

SYNCHRONOUS TEMPERATURE RATE CONTROL AND APPARATUS FOR REFRIGERATION WITH REDUCED ENERGY CONSUMPTION

STATEMENT REGARDING FEDERALLY SPONSORED RESEARCH AND DEVELOPMENT

This invention was made with government support under Award No. DE-EE0003910, awarded by the U.S. Department of Energy. The government has certain rights in the invention.

FIELD OF THE INVENTION

The present invention relates to refrigeration appliances and refrigeration methods of operation. More particularly, the invention relates to refrigeration configurations and methods to improve system efficiency by optimizing temperature control within the refrigeration compartments in the system.

BACKGROUND OF THE INVENTION

The energy efficiency of refrigerator appliances has a large impact on the overall energy consumption of a household. Refrigerators in particular must be as efficient as possible because they are usually operated in a continual fashion. Even a small improvement in the efficiency of a refrigerator appliance can translate into significant annual energy savings for a given household.

More efficient electrical components and/or improved thermal insulation materials have been used to improve refrigerator energy efficiency. However, these approaches add significant cost to the appliances. In many cases, the gains in efficiencies associated with these approaches are offset by the increased cost of the refrigerator appliance to the consumer.

Accordingly, there exists a need to improve the efficiency of a refrigerator appliance without a significant increase in the cost of the appliance itself. The refrigerator appliance configurations and methods of operation related to this invention address this need. Aspects of the invention provide a cost-effective temperature control approach that improves appliance energy efficiency. Energy savings are also realized by synchronized, non-independent control of the temperature in the compartments in the refrigerator appliance.

BRIEF SUMMARY OF THE INVENTION

One aspect of the present invention is to provide a refrigerator appliance that includes a condenser, a refrigerant, a compressor, a refrigeration compartment, a refrigeration compartment set point temperature, a freezer compartment, and a freezer compartment set point temperature. The appliance also includes an evaporator in thermal communication with the refrigeration and the freezer compartment, a refrigeration compartment fan for directing cool air in thermal communication with the evaporator to the refrigeration compartment, and a freezer compartment fan for directing cool air in thermal communication with the evaporator to the freezer compartment. The appliance further includes a refrigeration compartment sensor that generates a signal indicative of the temperature in the refrigeration compartment as a function of time, a freezer compartment sensor that generates a signal indicative of the temperature in the freezer compartment as a function of time, and a refrigerant circuit arranged to allow flow of the refrigerant between the condenser, the evaporator and the compressor. The appliance additionally includes a controller coupled to the compressor, freezer and refrigeration compartment fans, and freezer and refrigeration compartment sensors. The controller is adapted to receive the signals from the freezer and refrigeration compartment sensors, and is further adapted to synchronize alternating cycles of cooling the freezer and refrigeration compartments to temperatures approximately equal to their respective compartment set point temperatures by operation of one or more of the compressor, the refrigeration compartment fan and the freezer compartment fan.

A further aspect of the present invention is to provide a refrigerator appliance that includes a condenser, a refrigerant, a compressor, a refrigeration compartment, a refrigeration compartment set point temperature, a freezer compartment, and a freezer compartment set point temperature. The appliance also includes an evaporator in thermal communication with the refrigeration and the freezer compartments, an evaporator fan in fluidic communication with the evaporator, and a damper. The damper is configured to selectively direct or restrict flow of cool air from the evaporator fan to either of the compartments. The appliance further includes a refrigeration compartment sensor that generates a signal indicative of the temperature in the refrigeration compartment as a function of time, a freezer compartment sensor that generates a signal indicative of the temperature in the freezer compartment as a function of time, and a refrigerant circuit arranged to allow flow of the refrigerant between the condenser, the evaporator and the compressor. The circuit includes a valve system that directs or restricts flow of the refrigerant through one or both of a primary and a secondary pressure reduction device arranged in parallel within the circuit, upstream from the evaporator. The appliance additionally includes a controller coupled to the compressor, evaporator fan, valve system and damper. The controller is adapted to receive the signals from the freezer and refrigeration compartment sensors, and is further adapted to synchronize alternating cycles of cooling the freezer and refrigeration compartments to temperatures approximately equal to their respective compartment set point temperatures by operation of one or more of the compressor, the evaporator fan, the valve system and the damper.

Another aspect of the present invention is to provide a refrigerator appliance that includes a condenser, a refrigerant, a compressor, a refrigeration compartment, a refrigeration compartment set point temperature, a freezer compartment, and a freezer compartment set point temperature. The appliance also includes an evaporator in fluidic communication with the freezer compartment, an evaporator fan in fluidic communication with the evaporator, and a damper, wherein the damper is configured to selectively allow either flow of cool air directed by the evaporator fan to the refrigeration compartment, or to the freezer compartment. The appliance further includes a refrigeration compartment sensor that generates a signal indicative of the temperature in the refrigeration compartment as a function of time, a freezer compartment sensor that generates a signal indicative of the temperature in the freezer compartment as a function of time, and a refrigerant circuit arranged to allow flow of the refrigerant between the condenser, the evaporator and the compressor. The appliance additionally includes a controller coupled to the compressor, evaporator fan, damper, and freezer and refrigeration compartment sensors. The controller is adapted to receive the signals from the freezer and refrigeration compartment sensors, and is further adapted to synchronize alternating cycles of cooling the freezer and refrigeration compartments to temperatures approximately equal to their respective compartment set point temperatures by operation of one or more of the compressor, the evaporator fan and the damper.

A still further aspect of the present invention is to provide a refrigerator appliance that includes a condenser, a refrigerant, a compressor, a refrigeration compartment, a refrigeration compartment set point temperature, a freezer compartment, and a freezer compartment set point temperature. The appliance also includes a freezer compartment evaporator in thermal communication with the freezer compartment, a refrigeration compartment evaporator in thermal communication with the refrigeration compartment, a refrigeration compartment fan for directing cool air in thermal communication with the refrigeration compartment evaporator to the refrigeration compartment, and a freezer compartment fan for directing cool air in thermal communication with the freezer compartment evaporator to the freezer compartment. The appliance further includes a refrigeration compartment sensor that generates a signal indicative of the temperature in the refrigeration compartment as a function of time, a freezer compartment sensor that generates a signal indicative of the temperature in the freezer compartment as a function of time, and a refrigerant circuit arranged to allow flow of the refrigerant between the condenser, the evaporators and the compressor, wherein the circuit comprises a valve system configured to direct or restrict flow of refrigerant to either or both of the evaporators. The appliance additionally includes a controller coupled to the compressor, freezer and refrigeration compartment fans, freezer and refrigeration compartment sensors, and valve system. The controller is adapted to receive the signals from the freezer and refrigeration compartment sensors, and is further adapted to synchronize alternating cycles of cooling the freezer and refrigeration compartments to temperatures approximately equal to their respective compartment set point temperatures by operation of one or more of the compressor, the refrigeration compartment fan, the freezer compartment fan and the valve system.

These and other features, advantages, and objects of the present invention will be further understood and appreciated by those skilled in the art by reference to the following specification, claims, and appended drawings.

DETAILED DESCRIPTION

For purposes of description herein, the invention may assume various alternative orientations, except where expressly specified to the contrary. The specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Synchronous temperature control (STC) is a unique temperature control technique for refrigerator appliance configurations (and other types of refrigeration appliances) that includes at least two refrigeration compartments (e.g., a freezer compartment and a refrigeration compartment). One important aspect of STC is that the temperatures of both cabinets are controlled in a coupled manner, not independently of one another. Various refrigerator appliance configurations are viable with STC, provided that they allow for control of the cooling rate in one or more of the appliance refrigeration compartments. For example, single- and dual-evaporator refrigeration appliances can be operated using STC when configured with (a) a variable-capacity compressor and ON/OFF fans (i.e., evaporator or refrigeration compartment fans); (b) a variable-capacity compressor and variable fans; and (c) an ON/OFF compressor (e.g., a single-speed compressor) and variable speed fans. Preferred refrigerator appliance arrangements that are configured for use with STC include single-evaporator and dual-evaporator systems with a variable-capacity linear compressor and variable-speed fans.

One objective of STC is to minimize refrigerator appliance energy consumption while maintaining the temperature in each refrigeration compartment within a certain range of user-defined compartment set point temperatures. For example, an appliance with freezer compartment and refrigeration compartment set point temperatures of 0° F. and 39° F. may be controlled using STC to maintain the temperature within these compartments at +/−2° F. from these set point temperatures. In general, STC uses a hysteresis-type control approach that synchronizes the temperature in each compartment as a function of time. STC may do this through the control of the cooling rate in one or more of the compartments. During typical operation of the appliance, STC can ensure that the temperature in each compartment approaches the full range above and below the compartment set point temperature (i.e., "maximum compartment temperature swing"). Maximizing compartment temperature swing increases the overall energy efficiency of the appliance. Note, however, that maximizing compartment temperature swing may come at the expense of food preservation, which aims to reduce the temperature spread within the refrigeration compartment (i.e., fresh food compartment).

Figure 1:
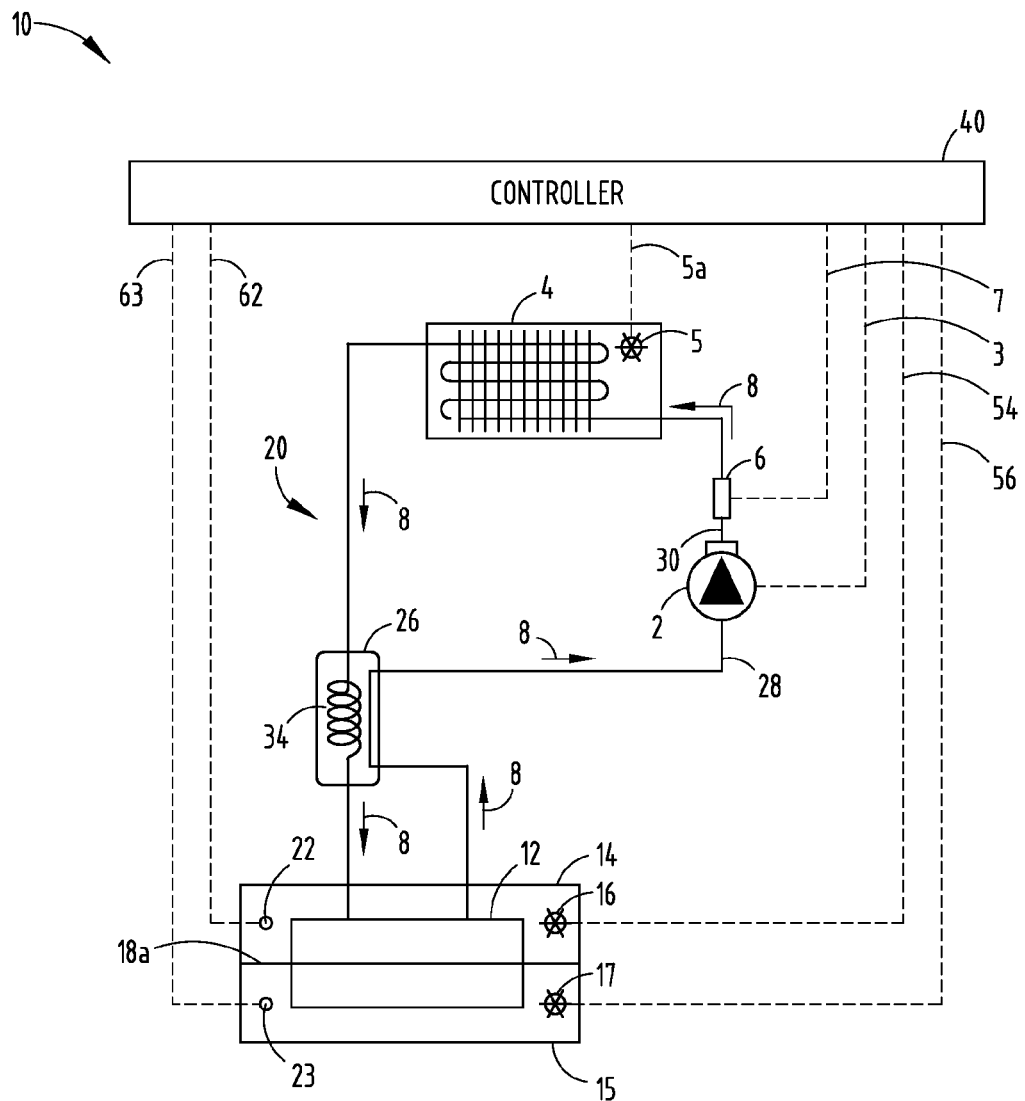
FIG. 1 is a refrigeration circuit diagram depicting a configuration with a condenser, a compressor, an evaporator, a refrigeration compartment, a freezer compartment, and two compartment fans that can be operated with synchronous temperature control.
Figure 1A:
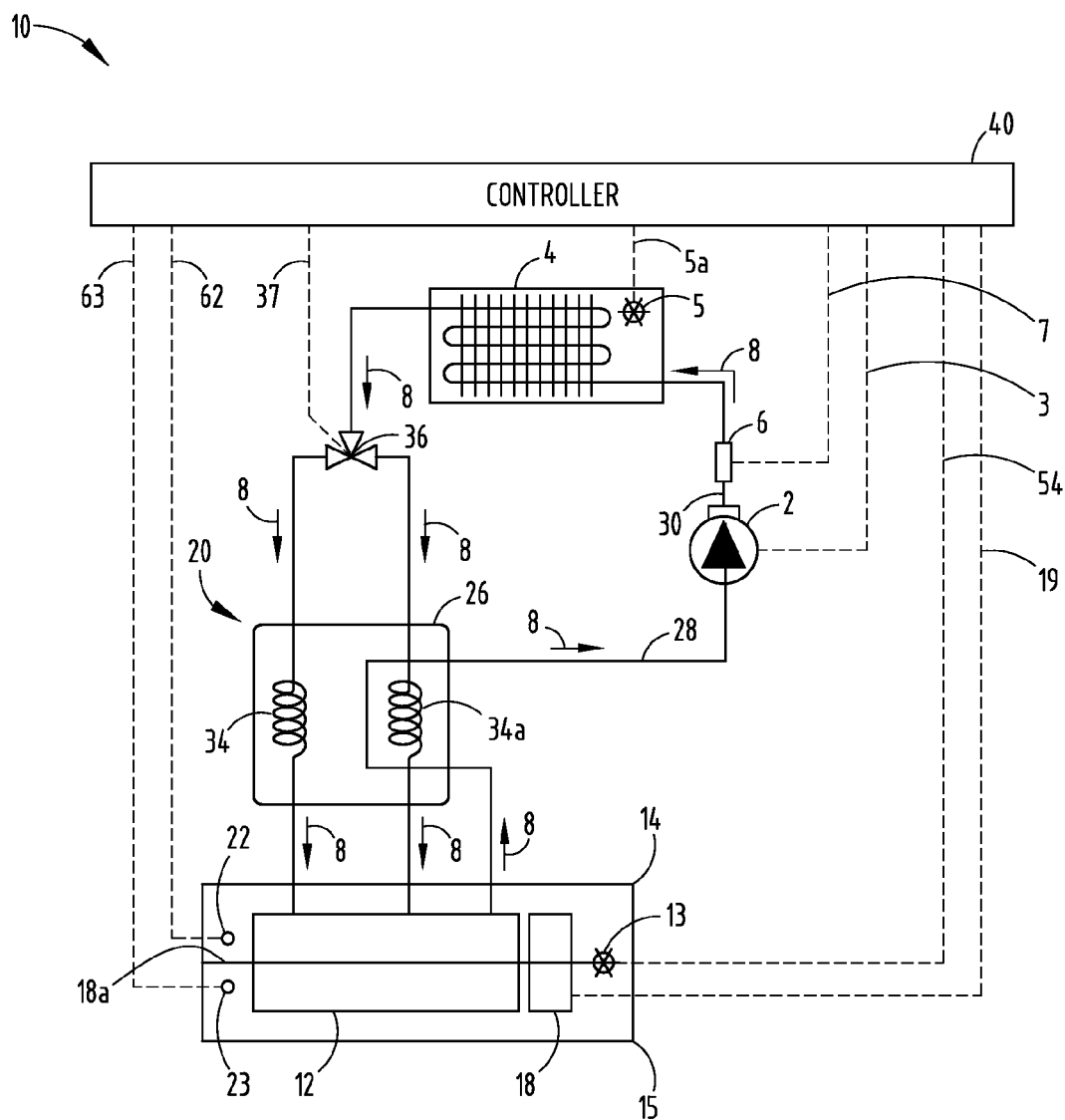
FIG. 1A is a refrigeration circuit diagram depicting a configuration with a condenser, a compressor, an evaporator, two pressure reduction devices, a refrigeration compartment, a freezer compartment, a switching valve to regulate evaporator temperature for the compartments, an evaporator fan, and a damper between the compartments that can be operated with synchronous temperature control.
Figure 2:
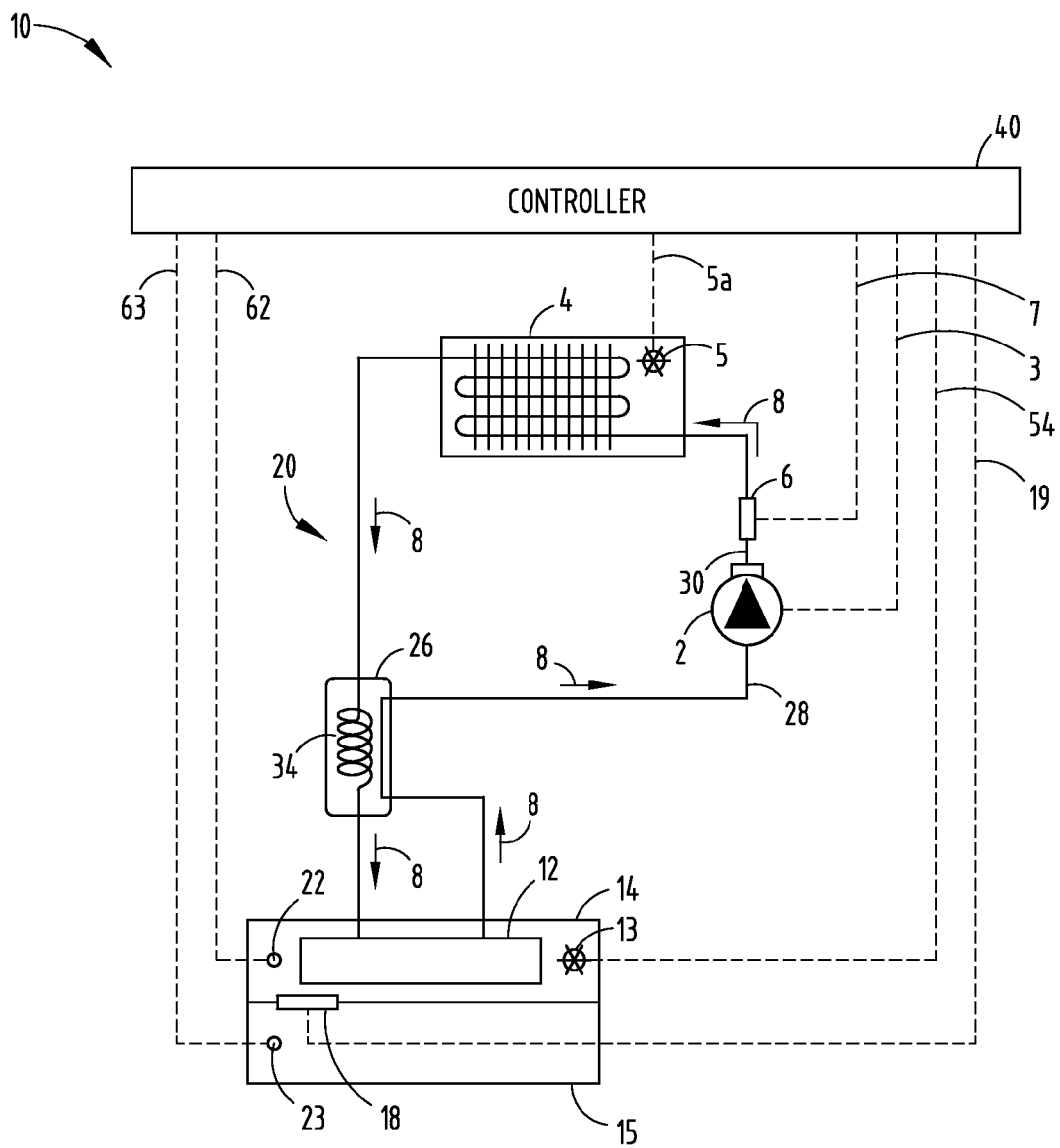
FIG. 2 is a refrigeration circuit diagram depicting a configuration with a condenser, a compressor, an evaporator, a refrigeration compartment, a freezer compartment, an evaporator fan and a damper between the compartments that can be operated with synchronous temperature control.

FIGS. 1, 1A and 2 each provide a schematic illustrating a single-evaporator refrigerator appliance configuration that can be operated with STC. Refrigerator appliance 10 is shown with a refrigerant circuit 20 and various control components. More particularly, refrigerant circuit 20 includes conduits (not labeled) allowing flow of refrigerant 8 through a compressor 2, condenser 4, pressure reduction device 34, a first evaporator 12 and then back to the compressor 2. In particular, compressor 2 supplies refrigerant 8 through compressor outlet line 30 to condenser 4. A check valve 6 may be placed in the compressor outlet line 30 to prevent reverse migration of refrigerant back into the compressor 2 during compressor OFF cycles, for example. Condenser 4 is optionally paired with a variable-speed condenser fan 5. The fan 5 can operate to further improve the efficiency of condenser 4 by imparting a flow of ambient air over condenser 4. This additional air flow over condenser 4 facilitates additional heat transfer (i.e., heat removal) during the phase change of refrigerant 8 from a gas to a liquid within condenser 4.

For the configurations depicted in FIGS. 1 and 2, refrigerant 8 then flows out of condenser 4 and is presented to pressure reduction device 34, located upstream of evaporator 12. Accordingly, refrigerant 8 flows through pressure reduction device 34 and into evaporator 12. Refrigerant 8 then exits evaporator 12 and flows through compressor inlet line 28 back into compressor 2, thus completing refrigerant circuit 20.

As for the configuration depicted in FIG. 1A, refrigerant 8 flows out of condenser 4 and is presented to valve system 36, located upstream of evaporator 12. Valve system 36 is one, three-way valve assembly that can direct the refrigerant through one, both or none of pressure reduction devices 34 and 34a. Refrigerant 8 thus flows into evaporator 12. Refrigerant 8 then exits evaporator 12 and flows through compressor inlet line 28 back into compressor 2, thus completing refrigerant circuit 20.

When refrigerant 8 existing in a liquid state flows through pressure reduction device 34 and/or secondary pressure reduction device 34a (FIG. 1A), it experiences a significant pressure and temperature drop. A substantial quantity of refrigerant 8 flashes to a vapor state during flow through pressure reduction devices 34 and 34a. Pressure reduction devices 34 and 34a may be constructed as capillary tubes, parallel capillary tubes with a switching valve, expansion valves, orifice restrictors, needle valves and/or any other suitable structures known in the art capable of performing the intended function. Furthermore, pressure reduction devices 34 and 34a can each be configured to subject refrigerant 8 to particular pressure reduction levels according to the particular appliance design and operational needs. Typically, pressure reduction devices 34 and 34a are set at different pressure reduction levels in the configuration depicted in FIG. 1A.

As will also be appreciated by those skilled in the art, refrigerant 8 can be composed of any of a number of conventional coolants employed in the refrigeration industry. For example, refrigerant 8 can be R-134a, R-600a or similar recognized refrigerants for vapor compression systems.

In the embodiments depicted in FIGS. 1, 1A and 2 (and those associated with FIG. 3 discussed later), compressor 2 may be a single-speed or single-capacity compressor, appropriately sized based on the particular system parameters of the refrigerator appliance 10. In addition, compressor 2 may also be a multi-capacity compressor capable of operation at any of a finite group of capacities or speeds. Still further, compressor 2 may also be a variable capacity or speed compressor (e.g., a variable speed, reciprocating compressor operating from 1600 to 4500 rpm or ~3:1 capacity range) or a linear compressor, capable of operating within a large, continuous range of compressor speeds and capacities. However, if compressor 2 is configured as a single-speed or single-capacity compressor, the STC-configured refrigeration appliance 10 must include variable-speed compartment fans and/or evaporator fans (see, e.g., fans 13, 16 and 17 in FIGS. 1, 1A and 2).

FIGS. 1, 1A and 2 further depict a refrigerator appliance 10 containing a freezer compartment 14 in thermal communication with first evaporator 12. A freezer compartment fan 16 (FIG. 1) or first evaporator fan 13 (FIGS. 1A and 2) may be located within the appliance to direct warmer air in freezer compartment 14 over the evaporator 12. Air manifolds or other types of heat exchange enhancement structures as known may be arranged to facilitate this heat transfer between evaporator 12 and freezer compartment 14. During operation of the refrigerant circuit 20, for example, the warmer air in freezer compartment 14 flows over evaporator 12 and is cooled by the refrigerant 8 passing through evaporator 12.

The refrigerator appliance 10 depicted in FIGS. 1, 1A and 2 also includes a refrigeration compartment 15, separated convectively from freezer compartment 14 by a mullion 18a (FIG. 1) or damper 18 (FIGS. 1A and 2). As also shown in FIGS. 1 and 1A, refrigeration compartment 15 may be configured in thermal communication with first evaporator 12. Further, in the configuration for appliance 10 depicted in FIG. 1, a refrigeration compartment fan 17 may be situated within refrigeration compartment 15. Compartment fan 17 can then be used to direct warmer air in refrigeration compartment 15 over the evaporator 12. Air manifolds or other types of heat exchange enhancement structures can be arranged to facilitate this heat transfer between evaporator 12 and refrigeration compartment 15. Warmer air in refrigeration compartment 15 flows over evaporator 12 and is cooled by refrigerant 8 passing through evaporator 12 during operation of refrigerant circuit 20.

Various air manifold configurations can provide evaporator airflow such that the evaporator 12 can be thermally isolated to either freezer compartment 14, or refrigeration compartment 15 or shared between both compartments proportionately. The configuration for refrigerator appliance 10 shown in FIG. 1A provides one such example where evaporator 12 is in thermal communication with freezer and refrigeration compartments 14 and 15. Damper 18 or some other similar structure may be operated to allow flow of air cooled by first evaporator 12 to extract heat from refrigeration compartment 15 and/or freezer compartment 14.

Alternatively, as shown in FIG. 2, damper 18 or some other suitable structure may be operated to allow flow of air cooled by first evaporator 12 to convectively extract heat from refrigeration compartment 15, thereby cooling compartment 15. If first evaporator fan 13 is activated and air flows through damper 18, a return air path is also required (not shown in FIG. 2). Return air path structures can be configured as known in the art.

Preferably, freezer compartment 14 is maintained at a temperature near or below 0° F. and acts as a standard freezer compartment in the refrigerator appliance 10. Preferably, appliance 10 employs refrigeration compartment 15 as a fresh food compartment set at a temperature in the range of 35-45° F. Other arrangements of compartments 14 and 15, first evaporator 12, fans 13, 16 and 17, damper 18, and mullion 18a are possible, provided that compartments 14 and 15 remain in thermal contact with evaporator 12.

As also depicted in the FIGS. 1, 1A and 2 embodiments, the refrigerant circuit 20 includes an optional suction line heat exchanger 26 arranged in thermal contact with primary pressure reduction device 34 and secondary pressure reduction device 34a, if present (see FIG. 1A). Heat exchanger 26 is also arranged in thermal contact with a portion of refrigerant circuit 20 that exits first evaporator 12 and drains into compressor inlet line 28.

During nominal (e.g., steady-state) operation conditions of the refrigerator appliance 10, refrigerant vapor 8 exiting first evaporator 12 flows through heat exchanger 26 and exchanges heat with relatively warmer refrigerant 8 that passes through pressure reduction devices 34 and/or 34a toward evaporator 12. Operation of heat exchanger 26 to warm refrigerant 8 passing back to the compressor 2, and cool the refrigerant 8 that passes through pressure reduction devices 34 and 34a toward evaporator 12, has the effect of improving the overall thermodynamic efficiency of the appliance during nominal operation conditions.

A controller 40 is also illustrated in FIGS. 1, 1A and 2. Controller 40 is arranged to control the operation of the refrigerator appliance 10. In general, controller 40 operates compressor 2, for example, to maintain freezer and refrigeration compartments 14 and 15 at various, desired temperatures and/or desired temperature ranges. Controller 40 may operate condenser fan 5 (if present) to further effect control of the temperature in compartments 14 and 15. In addition, controller 40 may operate damper 18 (see FIGS. 1A and 2), evaporator fan 13 (FIGS. 1A and 2), freezer compartment fan 16 (FIG. 1), refrigeration compartment fan 17 (FIG. 1) and/or check valve 6 (FIGS. 1, 1A and 2) to maintain desired temperatures in freezer and refrigeration compartments 14 and 15. Note that check valves are typically passive, not requiring electronic activation. Furthermore, controller 40 may be disposed to control and optimize the thermodynamic efficiency of the refrigerator appliance by controlling or adjusting damper 18, evaporator fan 13, freezer compartment fan 16, refrigeration compartment fan 17 and/or check valve 6 components.

Controller 40 is configured to receive and generate control signals via wiring arranged between and coupled to compressor 2, condenser fan 5, damper 18, evaporator fan 13, freezer compartment fan 16, and refrigeration compartment fan 17. In particular, wiring 3 and 7 are arranged to couple controller 40 with compressor 2 and check valve 6, respectively. Wiring 5a is arranged to couple controller 40 with condenser fan 5. Further, wiring 19, 3, 54, and 56 are arranged to couple controller 40 with damper 18, evaporator fan 13, freezer compartment fan 16, and refrigeration compartment fan 17, respectively.

In the embodiments illustrated in FIGS. 1, 1A and 2, controller 40 also relies on compartment temperature sensors to perform its intended function within the refrigerator appliance. In particular, controller 40 is coupled to sensors 22 and 23 via wiring 62 and 63, respectively. Further, sensors 22 and 23 are arranged in freezer and refrigeration compartments 14 and 15, respectively. Sensors 22 and 23 generate signals indicative of temperature as a function of time in their respective compartments 14 and 15 and send these data to controller 40. Thermistors, thermocouples, and other types of temperature sensors known in the art are suitable for use as sensors 22 and 23.

Figure 3:
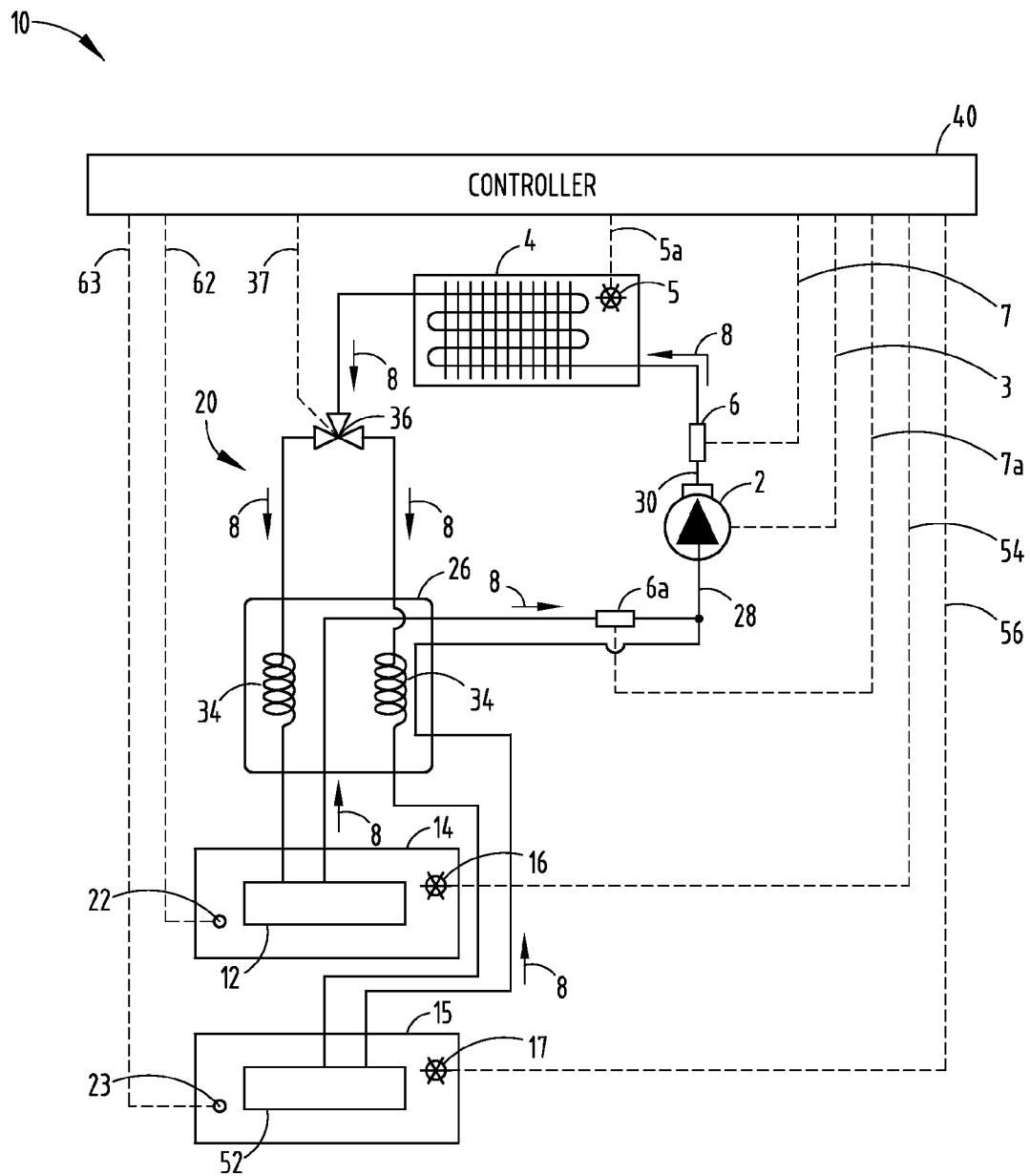
FIG. 3 is a refrigeration circuit diagram depicting a configuration with a condenser, a compressor, two evaporators arranged in parallel within a refrigerant circuit, a refrigeration compartment and fan, and a freezer compartment and fan that can be operated with synchronous temperature control.

FIG. 3 illustrates a dual-evaporator refrigerator appliance configuration that can be operated with STC (in contrast to the single-evaporator configurations depicted in FIGS. 1 and 2). Refrigerator appliance 10 is shown in FIG. 3 in schematic form with a refrigerant circuit 20, various control components, and two evaporators—first evaporator 12 and second evaporator 52. Accordingly, there are some differences in the refrigerant circuit 20 for this appliance 10 compared to the refrigerant circuit 20 employed by the embodiments for appliance 10 depicted in FIGS. 1, 1A and 2.

In the circuit 20 depicted in FIG. 3, refrigerant 8 exits condenser 4 and then is presented to valve system 36. As shown, valve system 36 is configured as one, three-way valve assembly that can direct or restrict flow of refrigerant 8 to one or both of the first and second evaporators 12 and 52. Both lines leading into evaporators 12 and 52 are configured with pressure reduction devices 34. These devices 34 may be configured as described earlier in connection with the embodiments depicted in FIGS. 1, 1A and 2. Accordingly, the valve system 36 in the appliance 10 depicted in FIG. 3 can direct refrigerant 8 through one or both of the pressure reduction devices 34 into evaporators 12 and 52. After exiting evaporators 12 and/or 52, refrigerant 8 then travels through compressor inlet line 28 back into compressor 2 to complete refrigerant circuit 20.

As also depicted in FIG. 3, the refrigerator appliance 10 includes a heat exchanging member arranged in the suction line of refrigerant circuit 20 leading back into compressor inlet line 28. In particular, suction line heat exchanger 26 is arranged within refrigerant circuit 20 in thermal communication with both pressure reduction devices 34 and the lines leading into first evaporator 12 and second evaporator 52. In addition, the portion of refrigerant circuit 20 that exits evaporators 12 and 52 and drains into compressor inlet line 28 is also configured to be in thermal communication with the suction line heat exchanger 26. Also, a second check valve 6a is configured in the portion of circuit 20 that exits first evaporator 12. Second check valve 6a prevents back flow of refrigerant 8 from the exit of second evaporator 52 into evaporator 12.

Alternatively, valve system 36 may be configured as a dual, one-way valve assembly for accomplishing the same function as one, three-way valve assembly for the configurations of refrigerator appliance 10 depicted in FIGS. 1A and 3. When the appliance 10 depicted in FIG. 3 employs a dual, one-way valve configuration for valve system 36 within refrigerant circuit 20, a first one-way valve (not shown) may be arranged upstream from evaporator 12 and a second one-way valve (not shown) may be arranged upstream from evaporator 52. Both one-way valves can then be operated to direct or restrict flow of refrigerant 8 to one or both of the first and second evaporators 12 and 52. In addition, other configurations for valve system 36 can be employed as understood in the art to accomplish the same function.

As for the appliance 10 depicted in FIG. 1A, it may also employ a dual, one-way valve configuration for valve system 36 within refrigerant circuit 20. Here, a first one-way valve (not shown) may be arranged upstream from pressure reduction device 34 and a second one-way valve (not shown) may be arranged upstream from pressure reduction device 34a. Both one-way valves can then be operated to direct or restrict flow of refrigerant 8 through these pressure reduction devices and on to evaporator 12. Further, other configurations of valve system 36 can be employed as known to accomplish the same function.

Valve system 36, whether configured as a single, three-way valve assembly, a dual, one-way valve assembly or another suitable configuration in FIGS. 1A and 3, for example, may include one or more of the following types of valves: solenoid-driven, single inlet and single outlet-type valves; solenoid-driven single inlet and selectable-outlet type valves; and stepper-motor driven single inlet and selectable-outlet type valves. Also, other types of valves or structures (e.g., manifolds) known in the art are permissible for use in valve system 36 that perform the intended three-way function of either line open, both lines open or both lines closed for the systems depicted in FIGS. 1A and 3.

As noted earlier, the embodiment of refrigerator appliance 10 depicted in FIG. 3 is a dual-evaporator configuration, having a first evaporator 12 and second evaporator 52. First evaporator 12 is arranged in thermal communication with freezer compartment 14. Freezer compartment fan 16 is arranged in the appliance 10 to direct warm air in compartment 14 over evaporator 12. When compressor 2 is operating and refrigerant 8 is flowing through refrigerant circuit 20 and into evaporator 12 by operation of valve system 36, for example, warm air in compartment 14 may be directed over first evaporator 12 by operation of fan 16. Flow of refrigerant 8 through evaporator 12 cools the warm air in freezer compartment 14 by this operation.

Second evaporator 52 is in thermal communication with the refrigeration compartment 15. Here, refrigeration compartment fan 17 is arranged to direct warm air in refrigeration compartment 15 over second evaporator 52. During operation of appliance 10 and compartment fan 17, for example, refrigerant 8 may flow through refrigerant circuit 20 and be directed by valve system 36 through evaporator 52. The warm air in refrigeration compartment 15 directed over evaporator 52 by fan 17 is then cooled by the refrigerant 8 flowing through evaporator 52.

Similar to the freezer and refrigeration compartments 14 and 15 depicted in FIGS. 1 and 1A, compartments 14 and 15 in the appliance 10 shown in FIG. 3 are convectively separated from one another. The compartments 14 and 15 in the appliance 10 are also depicted as conductively separated in FIG. 3. Nevertheless, freezer compartment 14 and refrigeration compartment 15 could be arranged in thermal contact with one another via a mullion (e.g., mullion 18a shown in FIG. 1), damper (e.g., damper 18 shown in FIGS. 1A and 2) or other suitable structure.

The controller 40, wiring and sensors configured in the refrigerator appliance 10 depicted in FIG. 3 is generally the same as the controller 40 elements discussed in connection with the embodiments depicted in FIGS. 1, 1A and 2. However, the controller 40 in the appliance 10 depicted in FIG. 3 is also coupled to receive a control wiring element 37 for the valve system 36. Accordingly, controller 40 is controllably coupled to valve system 36. As such, controller 40 can direct refrigerant 8 through either or both of the pressure reduction devices 34 shown in FIG. 3 and into either or both of the first and second evaporators 12 and 52. In addition, controller 40 is also controllably coupled via wiring 7a to the second check valve 6a arranged in the portion of refrigerant circuit 20 that exits first evaporator 12.

The embodiments of refrigerator appliance 10 in FIGS. 1-3 can each be operated in a similar manner to efficiently cool freezer compartment 14 and refrigeration compartment 15 to maintain the temperature in the respective compartments at various, desired temperatures. Controller 40 activates compressor 2 and valve system 36 (if present) during a compressor-ON cycle to cause flow of refrigerant 8 through refrigerant circuit 20 to chill evaporator 12 and/or evaporator 52 (if present). For example, refrigerant 8 is generally compressed in a vapor state to a higher temperature in compressor 2. Upon entering condenser 4, refrigerant 8 is cooled by the removal of heat at a constant pressure and condenses to a liquid state.

Refrigerant 8 is then directed through the pressure reduction device 34 (see, e.g., FIGS. 1-2); or through valve system 36 and then through pressure reduction device 34 and/or secondary pressure reduction device 34a (see FIG. 1A); or through valve system 36 and then through one or both of the pressure reduction devices 34 (see, e.g., FIG. 3). As refrigerant 8 passes through the pressure reduction device(s) 34 and/or 34a, it experiences a significant pressure drop. Much of the refrigerant 8 vaporizes and the temperature of the refrigerant 8 vapor/liquid mixture is decreased. Refrigerant 8 then enters evaporator 12 and/or evaporator 52 (if present). Typically, refrigerant 8 is then completely vaporized by the passage of warm air from freezer compartment 14 and/or refrigeration compartment 15. Refrigerant 8 then travels back through compressor inlet line 28 into compressor 2 to begin circulating again through refrigerant circuit 20.

Controller 40 can impart some efficiency gains to the refrigerator appliances 10 depicted in FIGS. 1-3 by operating according to certain procedures at the end of a compressor ON-cycle. In a typical refrigerator appliance, refrigerant will pool in a liquid state in the evaporators to levels that can reduce thermodynamic efficiency. The appliances 10 depicted in FIG. 1-3, however, can minimize or avoid this problem. In particular, controller 40 can engage valve system 36 (if present) to restrict flow of refrigerant 8 through the pressure reduction devices 34 and/or 34a and into evaporator 12 and evaporator 52 (if present). If performed at the end of a compressor-ON cycle, this action prevents or minimizes pooling of refrigerant 8 in a liquid state within evaporators 12 and 52 (if present).

Still further, controller 40 can obtain further thermodynamic efficiencies in the appliance 10 by operating evaporator fan 13, freezer compartment fan 16 and/or refrigeration compartment fan 17 at the end of a compressor-ON cycle. A continued, short term operation of fans 13, 16 and/or 17 can further extract cooling from the cold, evaporator 12 and/or evaporator 52, even after the compressor 2 is switched OFF.

Figure 4:
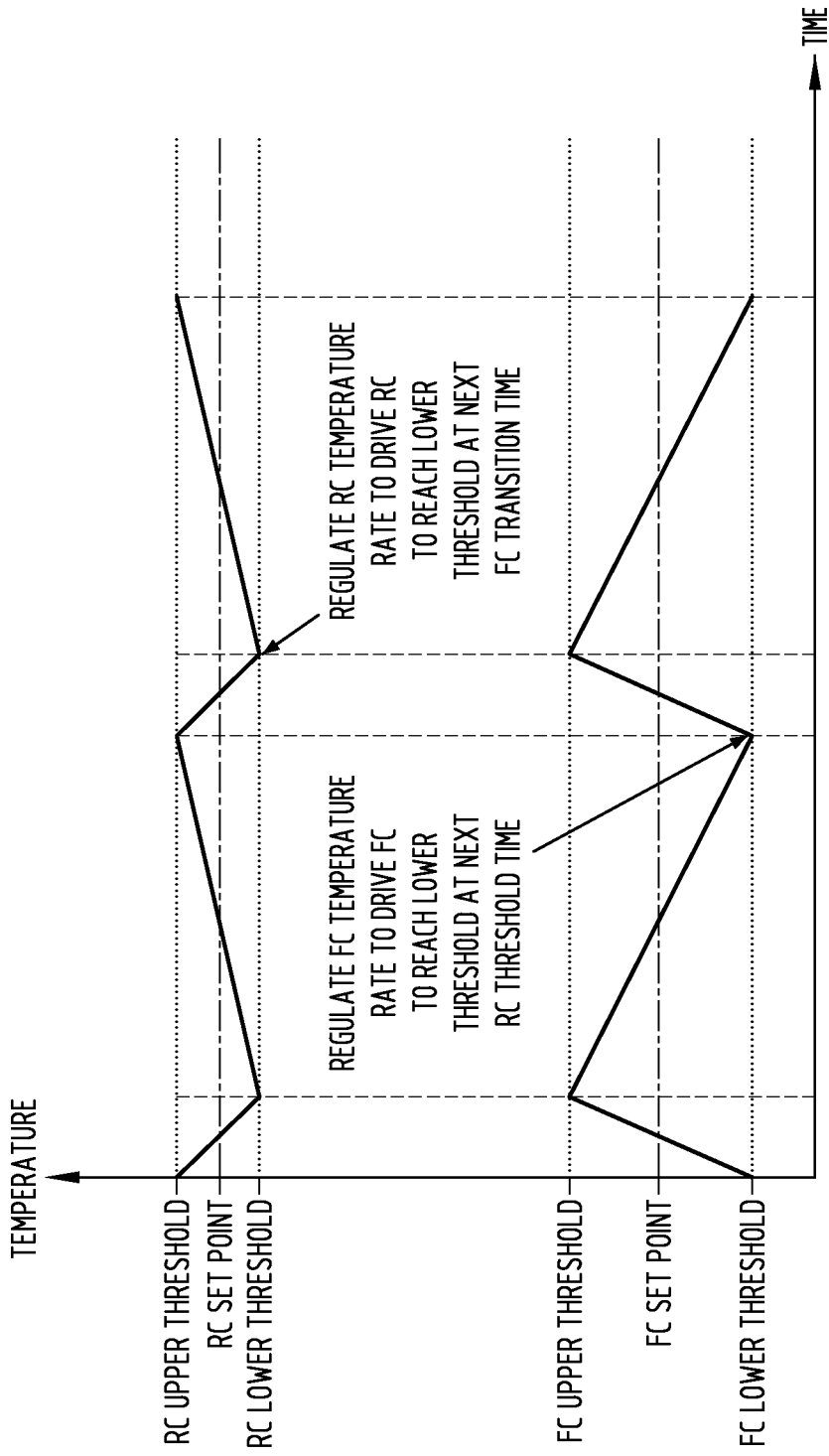
FIG. 4 is a schematic depicting a synchronous temperature control embodiment with alternating cooling cycles for a refrigeration and a freezer compartment.

FIG. 4 outlines one STC approach that may be used in connection with the configurations of refrigerator appliance 10 depicted in FIGS. 1, 1A, 2 and 3. The temperatures of a refrigeration compartment (RC) and a freezer compartment (FC) are plotted as a function of time for a refrigerator appliance configured to operate with STC. Set point, upper threshold and lower threshold temperatures are also depicted for the refrigeration and freezer compartments (e.g., "RC UPPER THRESHOLD", "FC LOWER THRESHOLD", etc.).

STC, as depicted in FIG. 4, is focused on improving the overall efficiency of the refrigerator appliance. Optimally, the compressor in the system should be activated when the temperature difference between the freezer and refrigeration compartments is minimized, and when relatively warm air from the refrigeration compartment is not being exchanged with the evaporator. Preferably, the cooling rate in the freezer compartment should be minimized to reduce power consumption. The most efficient time to cool the refrigeration compartment is when the temperature difference between the freezer and refrigeration compartments is at a maximum value.

Accordingly, STC controls and/or adjusts the cooling rate in the freezer compartment to ensure that the freezer compartment reaches its lower threshold temperature at approximately the same time that the refrigeration compartment reaches its upper threshold temperature. At this point, cooling of the freezer compartment is switched to the refrigeration compartment. Here, the cooling rate of the refrigeration compartment is controlled to ensure that the refrigeration compartment reaches its lower threshold temperature at approximately the same time that the freezer compartment reaches its upper threshold temperature. STC ensures that each compartment reaches its maximum compartment temperature swing by alternating control of the cooling rate in each of the compartments and synchronizing their cooling cycles. Consequently, STC-commanded temperature control in the freezer compartment (see FIG. 4) is dependent on the temperature dynamics in the refrigeration compartment and vice versa.

Figure 5:
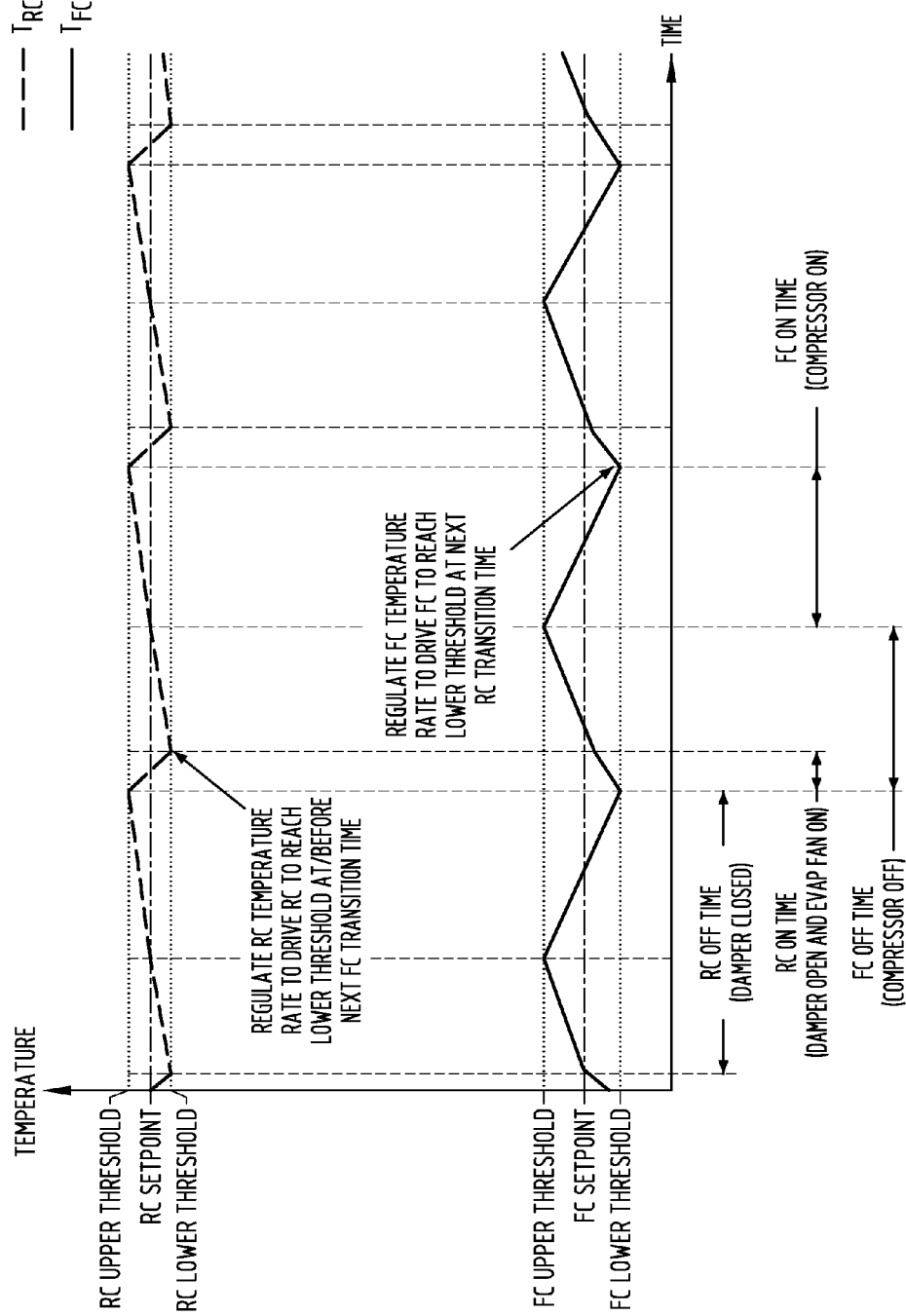
FIG. 5 is a schematic depicting a synchronous temperature control embodiment with alternating cooling cycles for a refrigeration and a freezer compartment for a refrigerator appliance with a single evaporator configuration.

FIG. 5 depicts an STC embodiment with alternating cooling cycles for a refrigeration and a freezer compartment for a refrigerator appliance with a single evaporator configuration as illustrated in FIGS. 1A and 2. The nomenclature in FIG. 5 is the same as that used in FIG. 4 (e.g., "RC UPPER THRESHOLD"). Like the embodiment depicted in FIG. 4, the STC approach in FIG. 5 adjusts the cooling rate in the freezer compartment to ensure that the freezer compartment reaches its lower threshold temperature at approximately the same time that the refrigeration compartment reaches its upper threshold temperature.

For example, controller 40 can adjust a variable speed or variable capacity compressor 2 to reach the required cooling rate in freezer compartment 14 to achieve this effect for the configurations of refrigerator appliance 10 depicted in FIGS. 1, 1A and 2. Accordingly, controller 40 places the compressor 2 into an ON state during the cycle of cooling for the freezer compartment 14. Further, controller 40 may adjust the freezer compartment fan 16 (FIG. 1), the evaporator fan 13, damper 18 (FIGS. 1A and 2) and/or condenser fan 5 (FIGS. 1, 1A and 2) to control the freezer compartment cooling rate.

Essentially, controller 40 adjusts the operational settings for these components to ensure that air circulating in freezer compartment 14 from evaporator 12 is colder than the current temperature and lower threshold temperature of the compartment. The cooling rate in freezer compartment 14 is governed by the temperature difference between the outlet air from evaporator 12 and the air within compartment 14. The cooling rate is also affected by the mass flow rate for the outlet air from evaporator 12 (i.e., higher mass flow rates correlate with a higher compartment 14 cooling rate). Other factors include the temperature difference between freezer compartment 14 and refrigeration compartment 15, and the difference in temperature between freezer compartment 14 and ambient temperature. Indeed, heat is transferred through mullion 18a or damper 18 between compartments 14 and 15, and this effect increases as the temperature difference between the compartments 14 and 15 increases.

Once the refrigeration compartment temperature has reached its upper threshold temperature, the STC embodiment in FIG. 5 can then switch to refrigeration compartment cooling. Here, the cooling rate in the refrigeration compartment is regulated to ensure that the temperature in the refrigeration compartment reaches the refrigeration compartment lower threshold temperature at approximately the same time, or before the time, that the freezer compartment reaches its upper threshold temperature. In a single evaporator appliance configuration, as depicted in FIG. 5, it is possible to cool the refrigeration compartment while the compressor is in an OFF state. For example, controller 40 can open damper 18 (see FIGS. 1A and 2) and control evaporator fan 13 to direct cool air in thermal contact with evaporator 12 into the refrigeration compartment 15. Alternatively, controller 40 can control refrigeration compartment fan 17 to circulate air in thermal contact with evaporator 12 through refrigeration compartment 15 (see FIG. 1) while the temperature of evaporator 12 is below the temperature of refrigeration compartment 15.

As depicted in FIG. 5, the refrigeration compartment is cooled to the refrigeration compartment lower threshold temperature before the freezer compartment temperature has reached the freezer compartment upper threshold temperature. At this point, both the freezer and refrigeration compartments are maintained at temperatures below their upper threshold limits. Accordingly, the compressor can remain in an OFF state. The freezer compartment cooling cycle then begins again (e.g., controller 40 operates compressor 2) once the freezer compartment has reached its upper threshold limit.

Figure 6:
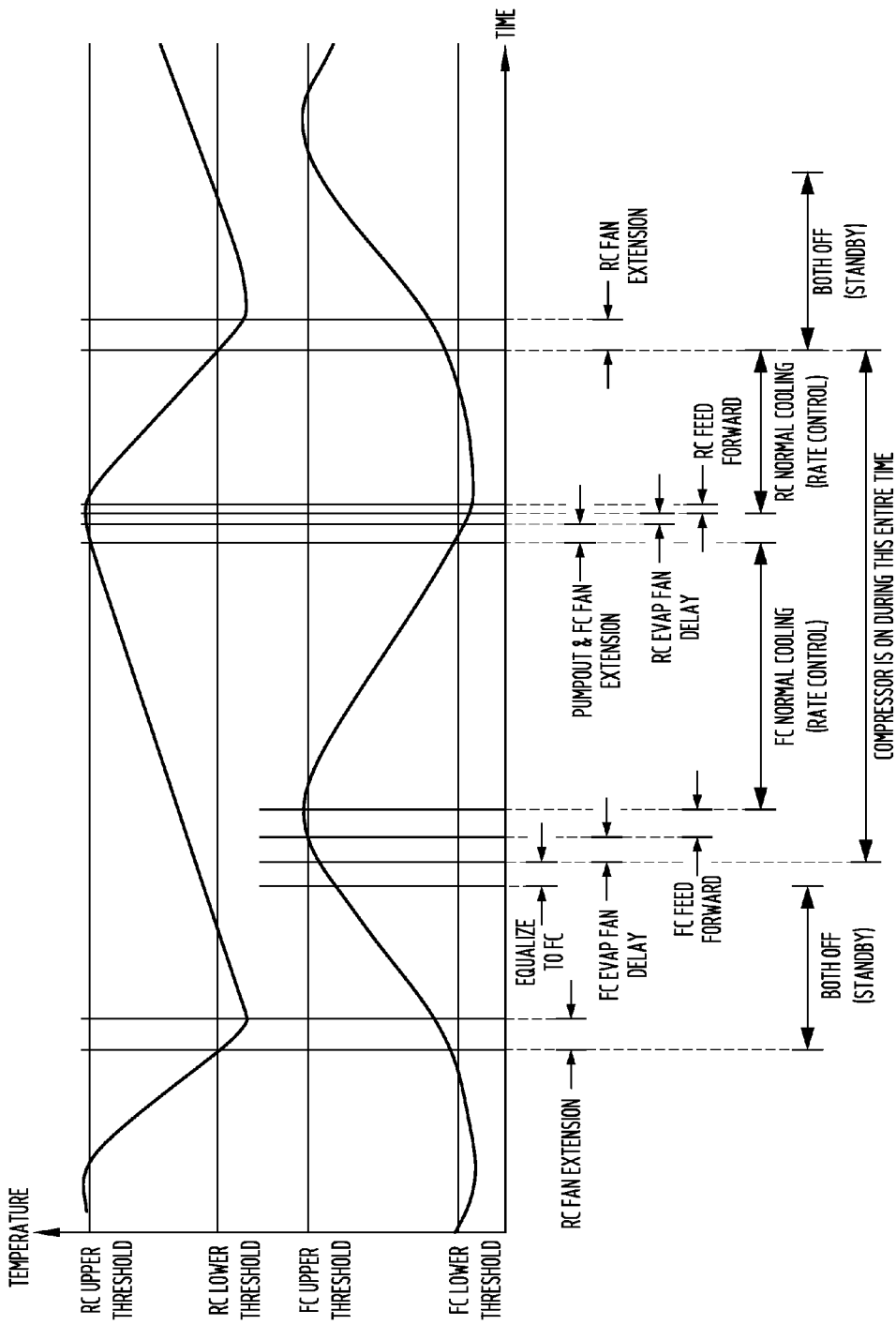
FIG. 6 is a schematic depicting a synchronous temperature control embodiment with alternating cooling cycles for a refrigeration and a freezer compartment for a refrigerator appliance with a dual evaporator configuration.

FIG. 6 depicts another STC embodiment for use in a refrigerator appliance with a sealed, dual evaporator configuration that relies on alternating cooling cycles for the refrigeration and freezer compartments. The nomenclature in FIG. 6 is the same as that used in FIGS. 4 and 5 (e.g., "RC UPPER THRESHOLD"). The temperature versus time schematic curves shown in FIG. 6 are based on actual data generated from prototype testing of a sealed, dual evaporator configuration comparable to the embodiment depicted in FIG. 3. The STC approach depicted in FIG. 6 for adjusting the cooling rate in the freezer and refrigeration compartments is essentially the same as depicted in FIG. 5. In particular, the freezer compartment cooling rate is adjusted to ensure that the freezer compartment reaches its lower threshold temperature at approximately the same time that the refrigeration compartment reaches its upper threshold temperature. Similarly, the cooling rate of the refrigeration compartment is adjusted to ensure that the temperature in the refrigeration compartment reaches its lower threshold temperature at approximately the same time, or before the time, that the freezer compartment temperature reaches its upper threshold temperature.

As depicted in FIG. 6, operation of a sealed, dual evaporator refrigerator appliance configuration (see, e.g., FIG. 3) according to STC can proceed in various steps and sequences. For example, once the upper threshold temperature in the freezer compartment 14 has been reached, or at some interval before or after this time, compressor 2 can be activated to begin a cooling cycle for freezer compartment 16. At some point thereafter, controller 40 directs refrigerant 8 into the first evaporator 12 via operation of valve system 36. This operation is indicated in FIG. 6 by the label, "FC FEED FORWARD." At about the same time, and after the "FC EVAP FAN DELAY" period, controller 40 operates freezer compartment fan 16 to circulate air in the freezer compartment 14 over sufficiently chilled evaporator 12, thereby cooling the compartment. Controller 40 then controls the cooling rate in freezer compartment 14 by adjusting the speed of fan 16 and/or compressor 2 to ensure that the freezer compartment 14 reaches its lower threshold at about the same time as the refrigeration compartment 15 reaches its upper threshold temperature. This period is labeled "FC NORMAL COOLING (RATE CONTROL)" in FIG. 6.

Once the temperature in freezer compartment 14 has reached its lower threshold temperature, and the temperature in the refrigeration compartment 15 has reached its upper threshold temperature (or, at some interval before or after this time), controller 40 can then begin the operational steps required to transition from the freezer compartment cooling cycle to the refrigeration compartment cooling cycle. In particular, controller 40 can continue to operate compressor 2 in an ON state and direct refrigerant 8 into the second evaporator 52 via operation of valve system 36. This operation is indicated in FIG. 6 by the label, "RC FEED FORWARD." Next, controller 40 can operate refrigeration compartment fan 17 to circulate air in the refrigeration compartment 15 over sufficiently chilled evaporator 52 to cool the compartment. Operation of fan 17 can occur during the RC FEED FORWARD step described earlier or after a slight delay (e.g., after the "RC EVAP FAN DELAY" period shown in FIG. 6). As shown in FIG. 6, the temperature in refrigeration compartment 15 may exceed its upper threshold during the RC EVAP FAN DELAY period, and before controller 40 has activated refrigeration compartment fan 17.

Controller 40 then controls the cooling rate in refrigeration compartment 15 by adjusting the speed of fan 17 and/or compressor 2 to ensure that the refrigeration compartment 15 reaches its lower threshold temperature at or before the time that the freezer compartment 14 reaches its upper threshold temperature. This period is labeled "RC NORMAL COOLING (RATE CONTROL)" in FIG. 6. Once the temperature in the refrigeration compartment 15 reaches the lower threshold temperature, controller 40 can then switch compressor 2 into an OFF state, "BOTH OFF (STANDBY)" as labeled in FIG. 6. STC may further require the continued operation of the refrigeration compartment fan 17 after the compressor 2 is switched to an OFF state—i.e., an "RC FAN EXTENSION" period. This operation can continue to cool the refrigeration compartment 15 without any further power consumption from compressor 2.

Figure 7:
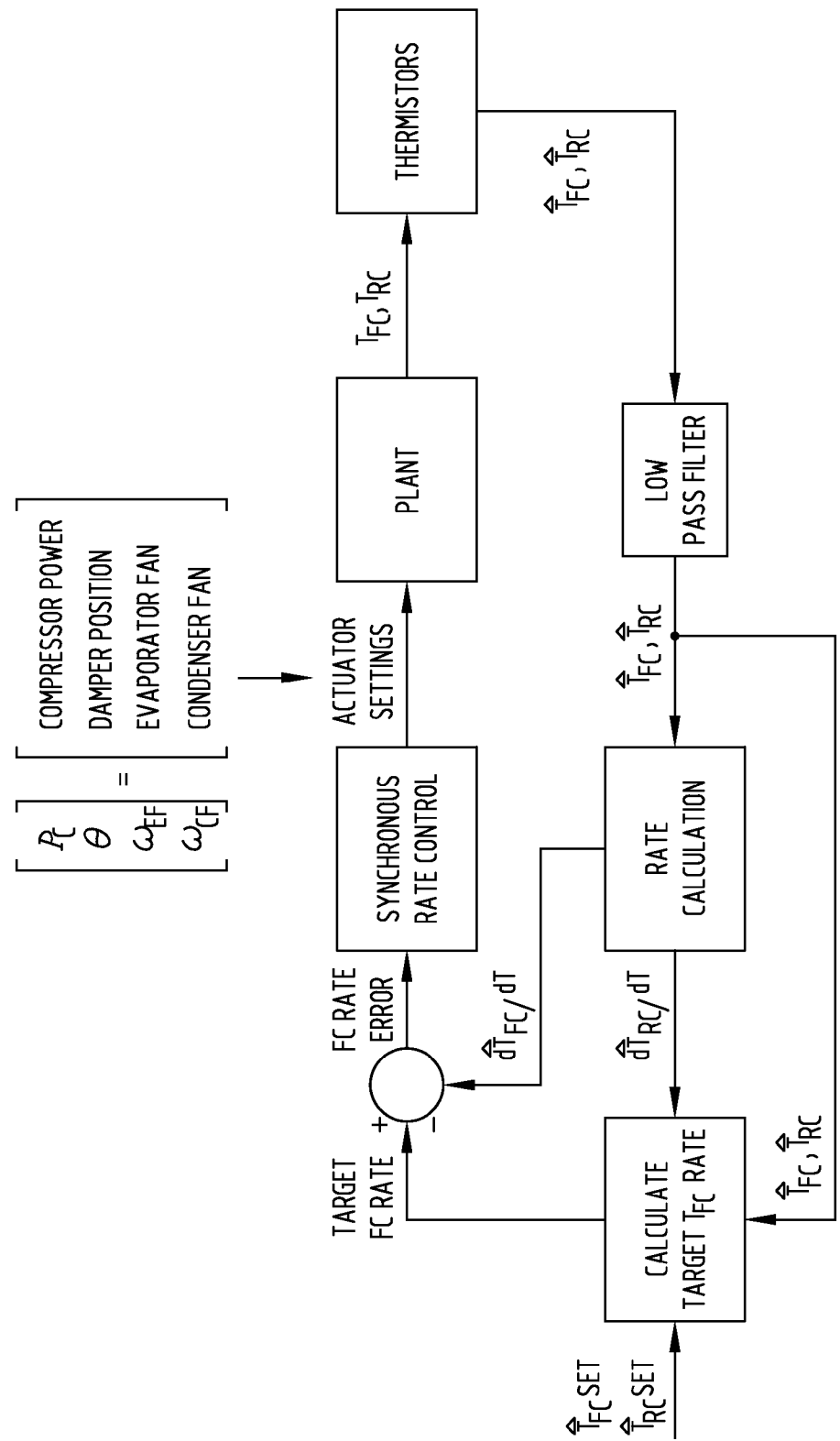
FIG. 7 is a flow chart schematic of a synchronous temperature control embodiment with freezer compartment cooling rate control for a refrigerator appliance with a sealed, single evaporator configuration.
Figure 8:
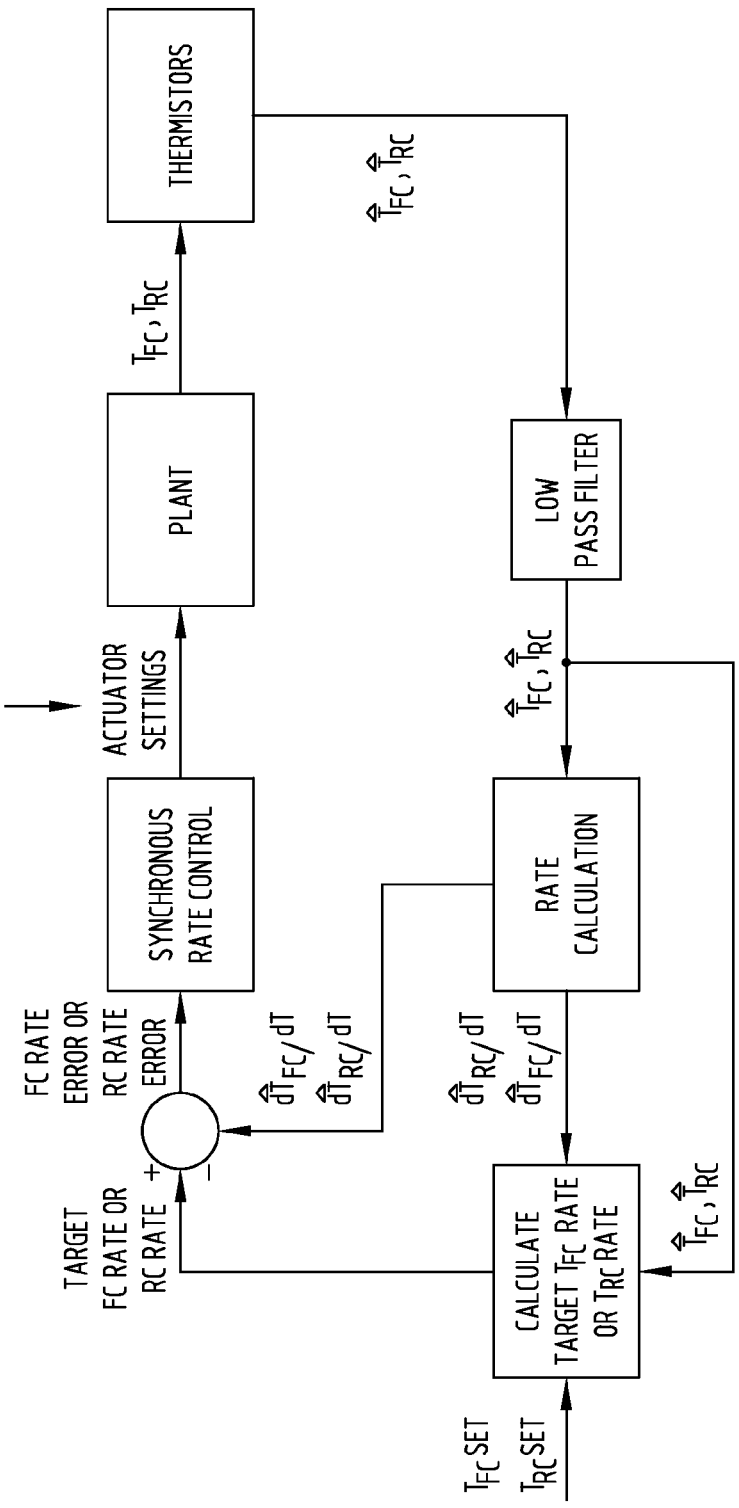
FIG. 8 is a flow chart schematic of a synchronous temperature control embodiment with freezer and refrigeration compartment cooling rate control for a refrigerator appliance with a sealed, dual evaporator configuration.

FIGS. 7 and 8 provide flow charts that depict STC operational schemes for certain refrigeration appliance configurations. FIG. 7 depicts STC operation with freezer compartment cooling rate control for a single-evaporator configuration with a controllable evaporator fan and damper (see, e.g., FIGS. 1A and 2). Here, the SYNCHRONOUS RATE CONTROL box represents STC operation by controller 40 to change various PLANT (i.e., the appliance system) settings. In the configurations for appliance 10 depicted in FIGS. 1A and 2, many system features may be varied to effect STC operation: power level for compressor 2 (e.g., compressor 2 is configured as a variable-speed compressor), position of damper 18, speed of evaporator fan 13, and/or the speed of condenser fan 5. In the configuration of appliance 10 shown in FIG. 1, freezer and refrigeration compartment fans 16 and 17 may also be varied to effect STC operation. In general, controller 40 adjusts these system components to control the cooling rate in freezer compartment 14 to ensure that the temperature in freezer compartment 14 reaches its lower threshold at approximately the same time that the temperature in the refrigeration compartment 15 reaches its upper threshold.

Controller 40 adjusts these parameters (e.g., power to compressor 2) in real-time as depicted in FIG. 7. Controller 40 receives temperature inputs $T_{FC}$ and $T_{RC}$ from compartments 14 and 15 via sensors 22 and 23. These measurements are evaluated as a function of time and outputted from the THERMISTORS box. Further, they are filtered by a low pass filter as known in the art and thus outputted from the LOW PASS FILTER box in FIG. 7. An actual cooling rate in freezer compartment 14 is then calculated in the RATE CALCULATION box and sent to the FC RATE ERROR evaluation point as $dT_{FC}/dt$. Meanwhile, the actual cooling rate (or, warming rate) in the refrigeration compartment 15 is calculated in the RATE CALCULATION box and sent to the CALCULATE TARGET $T_{FC}$ RATE box as $dT_{RC}/dt$.

The $dT_{RC}/dt$ (refrigerator compartment warming rate), actual compartment temperatures TFC and TRC, and compartment threshold temperatures $T_{FC}$SET and $T_{RC}$SET are then evaluated in the CALCULATE TARGET $T_{FC}$ RATE box to develop a target freezer compartment cooling rate. This value, the TARGET FC RATE, is then sent to the FC RATE ERROR evaluation point. Here, the target cooling rate for the freezer compartment 14 is compared to the actual cooling rate in the compartment. Based on this error (or difference), controller 40 then adjusts some or all of the system features described above in the SYNCHRONOUS RATE CONTROL box to effect STC operation and ensure that the temperature in the freezer compartment 14 reaches its lower threshold at approximately the same time as the temperature in the refrigeration compartment 15 reaches its upper threshold.

The STC operation depicted in FIG. 8 largely follows the STC operation described for FIG. 7. Here, however, the subject refrigerator appliance is a dual-evaporator configuration (i.e., similar to the configuration depicted in FIG. 3). Consequently, controller 40 may vary any of the following system features to effect STC control: power and/or speed of the compressor 2, position of the damper 18 (if present), position of the valve system 36 (3_WAY_POSITION in FIG. 8), speed of the freezer compartment fan 16 (FC_EVAP_FAN_SPEED), speed of the refrigeration compartment fan 17 (RC_EVAP_FAN_SPEED), and/or speed of the condenser fan 5 (COND_FAN_SPEED). The other key difference is that the STC control depicted in FIG. 8 involves control of the cooling rate in both the freezer and refrigeration compartments 14 and 15.

Accordingly, controller 40 calculates actual cooling rates $dT_{RC}/dt$ and $dT_{FC}/dt$ in the RATE CALCULATION box and passed these values on to the FC RATE ERROR and RC RATE ERROR evaluation points. Further, controller 40 develops target cooling rates for compartments 14 and 15 in the CALCULATE TARGET $T_{FC}$ and $T_{RC}$ RATE calculation boxes. Controller 40 then passes these values on to the FC RATE ERROR and RC RATE ERROR evaluation points. Here, the target cooling rate for freezer compartment 14 is calculated in a fashion similar to the methodology described for FIG. 7. In addition, the target cooling rate for refrigeration compartment 15 is compared to the actual cooling rate in the refrigeration compartment 15. Based on this error, controller 40 then adjusts some or all of the ACTUATOR SETTINGS for the system features described above (e.g., speed or power of the compressor 2) to effect STC operation. This ensures that the refrigeration compartment 15 reaches its lower threshold temperature at approximately the same time, or before the time, that the temperature in the freezer compartment 14 reaches its upper threshold.

Figure 9:
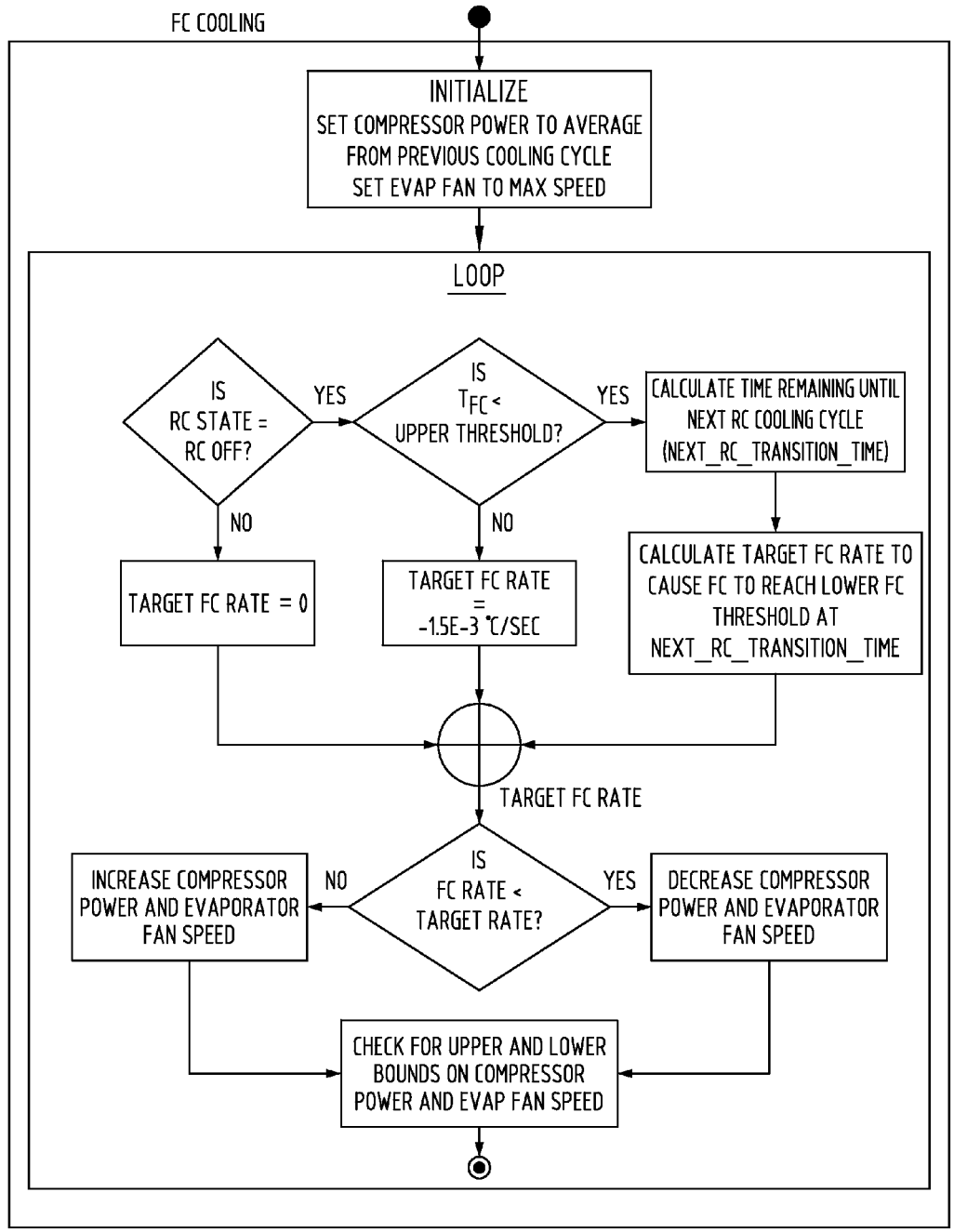
FIG. 9 is a flow chart schematic of the freezer compartment cooling rate calculation referenced in the synchronous temperature control schematics illustrated by FIGS. 7 and 8.
Figure 10:
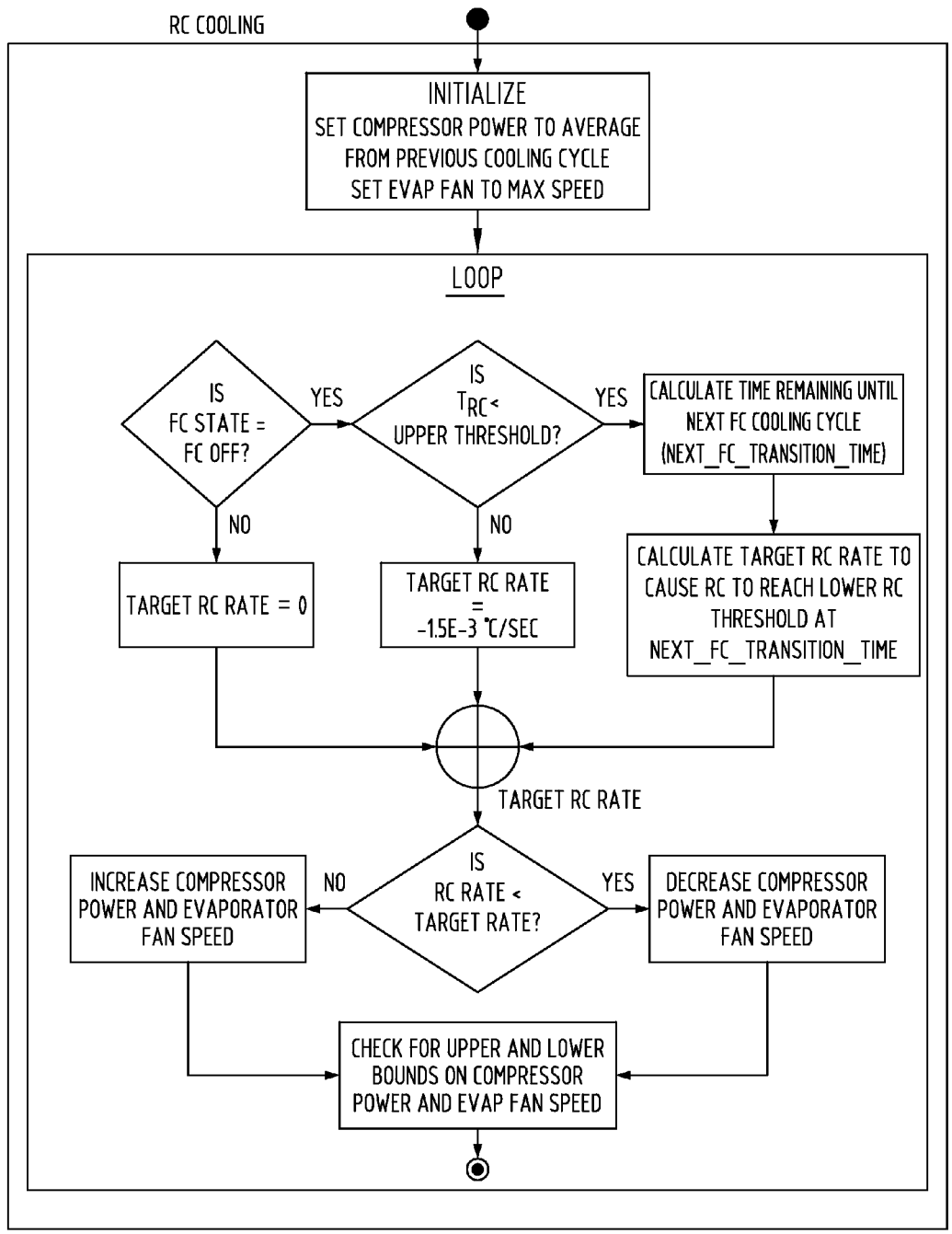
FIG. 10 is a flow chart schematic of the refrigeration compartment cooling rate calculation referenced in the synchronous temperature control schematics illustrated by FIGS. 7 and 8.

FIGS. 9 and 10 provide flow charts that depict freezer and refrigeration compartment cooling rate control methodologies, respectively, that may be employed in the CALCULATE TARGET RATE and RATE ERROR boxes/evaluation points shown in the flow charts depicted in FIGS. 7 and 8. At the beginning of a freezer or refrigeration compartment cooling cycle (i.e., the INITIALIZE block in FIGS. 9 and 10), the power of compressor 2 is set at an average from the prior cooling cycle, and the applicable fan (e.g., evaporator fan 13, freezer compartment fan 16 or refrigeration compartment fan 17) is set at its maximum speed by controller 40. If the temperature in the freezer compartment ($T_{FC}$) or refrigeration compartment ($T_{RC}$) is not less than the compartment upper threshold value, the target cooling rate in freezer compartment 14 or refrigeration compartment 15, as the case may be, is set at a value of $-1.5 \times 10^{-3}$ °C./second. Conversely, if the temperature in the compartment is less than its upper threshold value, a calculation is made to estimate the time remaining before the temperature in the other compartment reaches its upper threshold temperature (i.e., NEXT_RC_TRANSITION_TIME or NEXT_FC_TRANSITION_TIME). At this point, controller 40 then calculates a target compartment cooling rate (i.e., TARGET RC RATE or TARGET FC RATE) for the compartment to reach its lower threshold value at approximately the same time as the temperature in the other compartment is estimated to reach its upper threshold temperature.

As shown in FIGS. 9 and 10, the actual cooling rate in freezer compartment 14 or refrigeration compartment 15 is then compared to the TARGET RC or TARGET FC RATE. If the actual compartment cooling rate has a lower value compared to its target cooling rate (i.e., the rate of cooling is higher than needed), then controller 40 reduces the power of compressor 2 and speed of the applicable fan (e.g., evaporator fan 13) in the DECREASE COMPRESSOR POWER and EVAPORATOR FAN SPEED box. On the other hand, if the actual compartment cooling rate has a higher value compared to its target cooling rate (i.e., the rate of cooling is lower than needed), then controller 40 will increase the power of compressor 2 and the speed of the applicable fan in the INCREASE COMPRESSOR POWER and EVAPORATOR FAN SPEED box. These operations will continue during standard, steady-state operation of refrigerator appliance 10.

Figure 11:
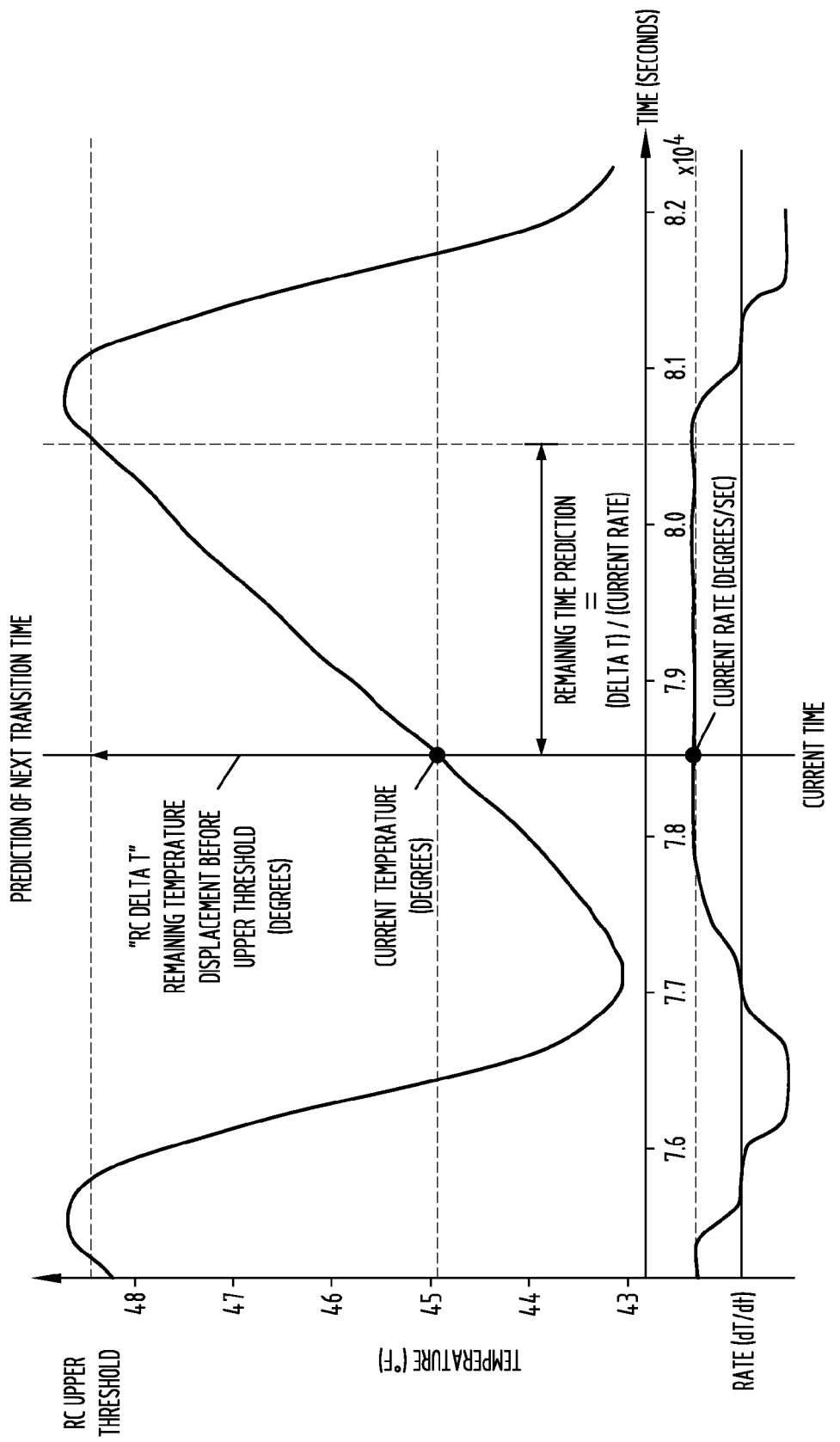
FIG. 11 is a schematic that depicts an estimation of the transition time when cooling can be switched to the refrigeration compartment during synchronous temperature control.

FIG. 11 illustrates an estimation of the transition time in which cooling of a refrigeration compartment should be initiated according to STC. As described earlier in connection with FIGS. 4-6, controller 40 can regulate the temperature in the freezer compartment 14 to reach its lower threshold temperature at approximately the same time that the temperature in the refrigeration compartment 15 reaches its upper threshold temperature. One key input for regulating the cooling rate in freezer compartment 14 is the temperature dynamic in the refrigeration compartment 15, including the rate in which the compartment temperature increases. As demonstrated in FIG. 11, the warming or temperature decay rate in refrigeration compartment 15 can be used to estimate the time remaining before the temperature in compartment 15 reaches its upper threshold temperature. This refrigeration compartment transition time is equal to the difference between the actual temperature in compartment 15 and its threshold temperature divided by the current warming rate in compartment 15 (see FIG. 11). It is at this point in time that controller 40 should transition to a cooling cycle for the refrigeration compartment 15.

Figure 12:
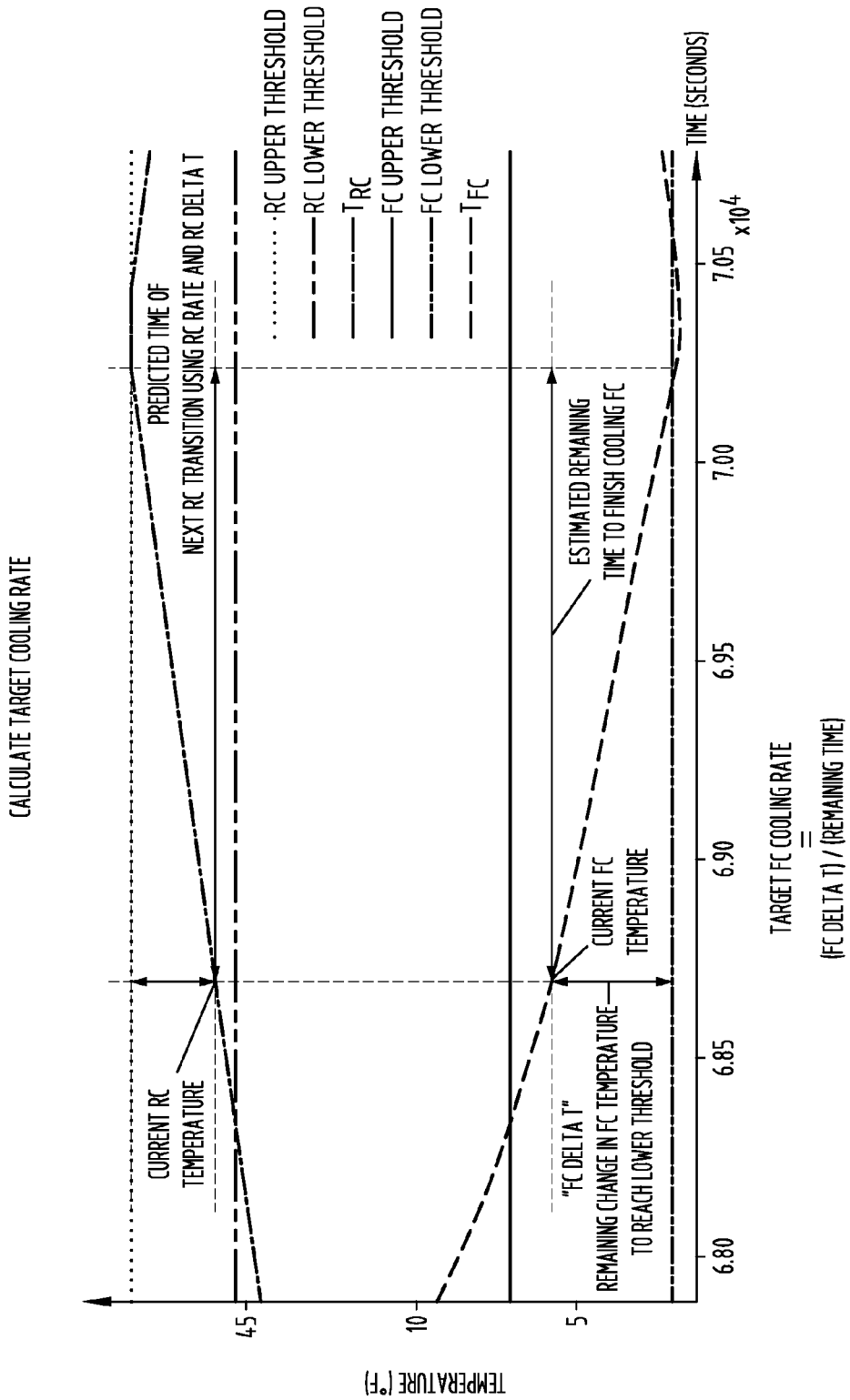
FIG. 12 is a schematic depicting a calculation of a target cooling rate for the freezer compartment based on an estimation of the refrigeration compartment cooling transition time as shown by FIG. 11.

As shown in FIG. 12, controller 40 can use the estimated refrigeration compartment transition time (i.e., the time in which controller 40 must begin the steps necessary to cool refrigeration compartment 15) from FIG. 11 and calculate a target cooling rate for freezer compartment 14. FIG. 12 demonstrates that the target freezer compartment cooling rate is equal to the difference between the actual temperature in freezer compartment 14 and the lower threshold temperature for compartment 14, divided by the estimated refrigeration compartment transition time. Essentially, controller 40 is configured to control the system features that can affect the cooling rate in the freezer compartment 14 to ensure that the cooling rate in freezer compartment 14 allows that compartment to reach its lower threshold at approximately the same time that cooling should be switched over to refrigeration compartment 15. As noted earlier, synchrony between the cooling cycles for the freezer and refrigeration compartments significantly improves thermodynamic efficiency for appliance 10.

As outlined earlier in the description associated with the dual-evaporator configuration for appliance 10 (see FIGS. 3, 6), STC operation by controller 40 for cooling the freezer compartment 14 may be initiated at some point in time before or after (e.g., before or after a short interval) the temperature in freezer compartment 14 reaches its upper threshold temperature. Similarly, STC operation by controller 40 for cooling of the refrigeration compartment 15 may be initiated at a time before or after the temperature in refrigeration compartment 15 reaches its upper threshold temperature. These aspects of STC operation, however, may also be employed in various configurations of refrigerator appliance 10, including the embodiments depicted in FIGS. 1 and 2 and described in this specification.

The intervals themselves can be predetermined as system-based constants. In other words, the intervals can be designed into the STC operational scheme for the appliance. They may depend on a known temperature decay rate (i.e., warming rate) in freezer compartment 14 and/or refrigeration compartment 15. Further thermodynamic efficiencies may be achieved by providing a built-in delay before controller 40 initiates a cooling cycle for refrigeration compartment 15 to take into account the particular heat transfer properties and thermal inertia associated with a particular system. Similarly, a predetermined interval may also depend on the system-related time lags associated with switching between cooling freezer compartment 14 and refrigeration compartment 15.

STC operational schemes can also employ time intervals that may vary in real time to advance or delay the transition between freezer compartment and refrigeration compartment cooling cycles (and vice versa). Intervals set in this manner can be calculated as a function of known, system-related properties (e.g., a known temperature decay rate in freezer compartment 14). Further, the intervals can be calculated and varied based on the actual temperature decay rates measured in freezer compartment 14 and/or refrigeration compartment 15. The intervals can also depend on the actual difference between the actual compartment temperature and the compartment threshold temperature at a given time. The algorithms used to set these intervals may be based on compartment temperature modeling and/or actual testing of refrigeration appliance configurations using methods known in the art. Ultimately, these intervals are set and adjusted to further improve system thermodynamic efficiency and to potentially account for other system-related influences (e.g., differences in ambient temperatures and humidity, thermal load associated with stored food and liquid product, etc.).

STC, and the appliance configurations arranged to operate with STC, provide various benefits and advantages over known, refrigerator appliance operational schemes. Simulation testing has demonstrated that appliances operating under STC can achieve significant energy efficiency gains. If an STC-configured appliance needs improved food preservation performance, the maximum swing temperature within the compartments can be reduced with STC. For example, a system configured with a variable capacity compressor can be operated at a higher-than-target freezer compartment cooling rate. This ensures that the refrigeration compartment temperature will be well below its upper threshold at the time in which the freezer compartment reaches its lower threshold temperature. Hence, the food in the refrigeration compartment will experience lower temperature swings, improving food preservation performance.

Single-evaporator configurations that employ STC can also be operated to reduce the frequency of defrost cycles. Frost forms when warm, humid air from the refrigeration compartment contacts the cold, evaporator surfaces. The rate of frost formation increases as the temperature difference between the humid air and the evaporator surface increases. With STC, the evaporator surface temperature is generally higher than in conventional compartment control schemes. Accordingly, the frost formation rate decreases, resulting in less frequent defrost cycles (and less defrost energy usage).

Other variations and modifications can be made to the aforementioned structures and methods without departing from the concepts of the present invention. For example, other refrigerator appliance configurations capable of compartment cooling rate control can be employed using STC operational schemes. STC techniques can also be employed in other appliances and products with multiple refrigeration compartments set at different, desired temperatures. These concepts, and those mentioned earlier, are intended to be covered by the following claims unless the claims by their language expressly state otherwise.

The invention claimed is:

1. A refrigerator appliance, comprising:
a condenser, a refrigerant, and a compressor;
a refrigeration compartment having a refrigeration compartment set point temperature;
a refrigeration compartment upper threshold temperature set above the refrigeration compartment set point temperature;
a refrigeration compartment lower threshold temperature set below the refrigeration compartment set point temperature;
a freezer compartment having a freezer compartment set point temperature;
a freezer compartment upper threshold temperature set above the freezer compartment set point temperature;
a freezer compartment lower threshold temperature set below the freezer compartment set point temperature;
an evaporator in thermal communication with the refrigeration compartment and the freezer compartment;
a refrigeration compartment fan for directing cool air in thermal communication with the evaporator to the refrigeration compartment;
a freezer compartment fan for directing cool air in thermal communication with the evaporator to the freezer compartment;
a refrigeration compartment sensor that generates a signal indicative of a temperature in the refrigeration compartment as a function of time;
a freezer compartment sensor that generates a signal indicative of a temperature in the freezer compartment as a function of time;
a refrigerant circuit arranged to allow flow of the refrigerant between the condenser, the evaporator and the compressor; and
a controller coupled to the compressor, freezer and refrigeration compartment fans, and freezer and refrigeration compartment sensors, wherein the controller is adapted to receive the signals from the freezer and refrigeration compartment sensors, and further adapted to synchronize alternating cycles of cooling the freezer and refrigeration compartments to temperatures approximately equal to their respective compartment set point temperatures by operation of one or more of the compressor, the refrigeration compartment fan and the freezer compartment fan, and further wherein the controller is adapted to begin a cycle of cooling the refrigeration compartment at substantially a same time as the temperature in the freezer compartment reaches the freezer compartment lower threshold temperature, and begin a cycle of cooling the freezer compartment at substantially a same time as the temperature in the freezer compartment reaches the freezer compartment upper threshold temperature by operation of one or more of the compressor, the refrigeration compartment fan and the freezer compartment fan, and further adapted to control a rate of cooling in the freezer compartment such that the temperature in the freezer compartment during the cycle of cooling the freezer compartment reaches the freezer compartment lower threshold temperature at substantially a same time as the temperature in the refrigeration compartment reaches the refrigeration compartment upper threshold temperature by operation of one or more of the compressor, the refrigeration compartment fan and the freezer compartment fan.

2. A refrigerator appliance according to claim 1, wherein the controller is further adapted to control a rate of cooling in the refrigeration compartment such that the temperature in the refrigeration compartment during the cycle of cooling the refrigeration compartment reaches the refrigeration compartment lower threshold temperature at substantially a same time, or before a time, that the temperature in the freezer compartment reaches the freezer compartment upper threshold temperature by operation of one or more of the compressor, the refrigeration compartment fan and the freezer compartment fan.

3. A refrigerator appliance according to claim 1, wherein the compressor is selected from the group consisting of a variable speed compressor, a linear compressor, a variable capacity compressor and a two-speed compressor, and further wherein the freezer and refrigeration compartment fans are selected from the group consisting of single-speed fans and variable-speed fans.

4. A refrigerator appliance according to claim 1, wherein the compressor is selected from the group consisting of a single-speed compressor and a single-capacity compressor, and further wherein the freezer and refrigeration compartment fans are variable-speed fans.

5. A refrigerator appliance, comprising:
a condenser, a refrigerant, and a compressor;
a refrigeration compartment and a freezer compartment;
an evaporator in thermal communication with the refrigeration and the freezer compartment;
a refrigeration compartment fan for directing cool air in thermal communication with the evaporator to the refrigeration compartment;
a freezer compartment fan for directing cool air in thermal communication with the evaporator to the freezer compartment;
a refrigeration compartment sensor and a freezer compartment sensor; and
a controller coupled to the compressor, freezer and refrigeration compartment fans, and freezer and refrigeration compartment sensors, wherein the controller is adapted to receive signals from the freezer and refrigeration compartment sensors, and control a rate of cooling in the freezer compartment such that a temperature in the freezer compartment during a cycle of cooling the freezer compartment reaches a freezer compartment lower threshold temperature at substantially a same time as a temperature in the refrigeration compartment reaches a refrigeration compartment upper threshold temperature; wherein the freezer compartment lower threshold temperature is set below a freezer compartment set point temperature; and wherein the refrigeration compartment upper threshold temperature is set above a refrigeration compartment set point temperature.

* * * * *